(12) United States Patent
Lee et al.

(10) Patent No.: US 12,530,290 B2
(45) Date of Patent: Jan. 20, 2026

(54) OPERATION METHOD OF HOST CONFIGURED TO CONTROL STORAGE DEVICE FOR PROCESSING EXCEPTIONS AND OPERATION METHOD OF STORAGE SYSTEM INCLUDING HOST AND STORAGE DEVICE

(71) Applicant: SAMSUNG ELECTRONICS CO., LTD., Suwon-si (KR)

(72) Inventors: Jungtae Lee, Suwon-si (KR); Yejin Jo, Suwon-si (KR); Jungyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/611,345

(22) Filed: Mar. 20, 2024

(65) Prior Publication Data
US 2025/0094335 A1  Mar. 20, 2025

(51) Int. Cl.
*G06F 12/02* (2006.01)
(52) U.S. Cl.
CPC .................. *G06F 12/0246* (2013.01)
(58) Field of Classification Search
CPC .... G06F 3/0659; G06F 3/0604; G06F 3/0679; G06F 12/0868; G06F 2212/214; G06F 2212/222; G06F 2212/7203; G06F 12/126; G06F 12/0246; G11C 11/5621; G11C 2211/5641
See application file for complete search history.

(56) References Cited

U.S. PATENT DOCUMENTS

| | | | |
|---|---|---|---|
| 8,417,924 B2 | 4/2013 | Circello et al. |
| 9,026,854 B2 | 5/2015 | Jeong et al. |
| 9,164,890 B2 | 10/2015 | Shin et al. |
| 9,348,537 B2 | 5/2016 | Raviv et al. |
| 10,418,115 B2 | 9/2019 | Blodgett et al. |
| 11,507,311 B2 | 11/2022 | Park et al. |

(Continued)

FOREIGN PATENT DOCUMENTS

| | | |
|---|---|---|
| JP | 2000-194683 A | 7/2000 |
| KR | 10-1754545 B1 | 7/2017 |

(Continued)

OTHER PUBLICATIONS

Jedec Standard, Universal Flash Storage (UFS), Version 4.0, JESD220F, Jedec Solid State Technology Association, Aug. 2022, 489 pages.

(Continued)

*Primary Examiner* — Tasnima Matin
(74) *Attorney, Agent, or Firm* — Sughrue Mion, PLLC

(57) ABSTRACT

An operation method of a host configured to control a storage device includes receiving, from the storage device, a first response universal flash storage (UFS) protocol information unit (UPIU) including first event occurrence information indicating an occurrence of a first exception event, receiving, from the storage device prior to an exception event check cycle elapsing, a second response UPIU including second event occurrence information indicating an occurrence of a second exception event, and preventing processing of the second exception event, based on the second exception event occurring prior to the exception event check cycle elapsing.

19 Claims, 22 Drawing Sheets

(56) References Cited

U.S. PATENT DOCUMENTS

| | | | |
|---|---|---|---|
| 11,556,464 B2 | 1/2023 | Kim et al. | |
| 2012/0036341 A1* | 2/2012 | Morfey | G06F 9/48 |
| | | | 712/E9.035 |
| 2014/0244908 A1 | 8/2014 | Kim et al. | |
| 2015/0199406 A1* | 7/2015 | Liang | H04L 41/0622 |
| | | | 707/754 |
| 2016/0231950 A1* | 8/2016 | Kim | G06F 3/0659 |
| 2019/0013081 A1* | 1/2019 | Blodgett | H04L 9/0861 |
| 2020/0218672 A1 | 7/2020 | Blodgett et al. | |
| 2021/0034285 A1* | 2/2021 | Kim | G06F 3/0652 |
| 2021/0374079 A1* | 12/2021 | Shin | G06F 13/382 |
| 2022/0197510 A1 | 6/2022 | Lee et al. | |
| 2022/0197558 A1 | 6/2022 | Choi | |
| 2022/0283968 A1* | 9/2022 | Kim | G06F 13/1689 |
| 2024/0248780 A1 | 7/2024 | Jo et al. | |

FOREIGN PATENT DOCUMENTS

| | | |
|---|---|---|
| KR | 10-1861744 B1 | 5/2018 |
| KR | 10-1911059 B1 | 10/2018 |
| KR | 10-2024-0116256 A | 7/2024 |

OTHER PUBLICATIONS

Jedec Standard, Universal Flash Storage Host Controller Interface (UFSHCI), Version 4.0, JESD223E, Jedec Solid State Technology Association, Aug. 2022, 114 pages.

Communication dated Oct. 8, 2024, issued by European Patent Center in European Patent Application No. 24172413.7.

* cited by examiner

FIG. 4

| ATTRIBUTES | | | | | | | |
|---|---|---|---|---|---|---|---|
| IDN | Name | Access Property | Size | Type<br># Ind.<br># Sel. | MDV | Description | Notes |
| 0Dh | wException<br>EventControl | Read/<br>Volatile | 2 byte | D | 000h | Exception Event Control This attribute enables the setting of the EVENT_ALERT bit of Device Information field, which is contained in the RESPONSE UPIU.<br>  EVENT_ALERT is set to one if at least one exception event occured (wExceptionEventStatus[i]) and the corresponding bit in this attribute is one<br>  Bit 0: DYNCAP_EVENT_EN<br>  Bit 1: SYSPOOL_EVENT_EN<br>  Bit 2: URGENT_BKOPS_EN<br>  Bit 3: TOO_HIGH_TEMP_EN<br>  Bit 4: TOO_LOW_TEMP_EN<br>  Bit 5: WRITEBOOSTER_EVENT_EN<br>  Bit 6: PERFORMANCE_THROTTLING_EN<br>  Bit 7 -15: Reserved | |
| 0Eh | wException<br>EventStatus | Read<br>only | 2 byte | D | 000h | Each bit represents an exception event.<br>  A bit will be set only if the relevant event has occurred (regardless of the wExceptionEventControl status).<br>  Bit 0: DYNCAP_NEEDED<br>  Bit 1: SYSPOOL_EXHAUSTED<br>  Bit 2: URGENT_BKOPS<br>  Bit 3: TOO_HIGH_TEMP<br>  Bit 4: TOO_LOW_TEMP<br>  Bit 5: WRITEBOOSTER_FLUSH_NEEDED<br>  Bit 6: PERFORMANCE_THROTTLING<br>  Bit 7 -15: Reserved | |

FIG. 5B

| | | | | Type | | | |
|---|---|---|---|---|---|---|---|
| | | | | ATTRIBUTES | | | |
| IDN | Name | Access Property | Size | Type<br># Ind.<br># Sel. | MDV | Description | Notes |
| 18h | bDeviceCaseRough Temperature | Read only | 1 byte | D | 000h | Device's rough package case surface temperature.<br>This value shall be valid when (TOO_HIGH_TEMPERATURE is supported and TOO_HIGH_TEMP_EN is enabled) or (TOO_LOW_TEMPERATURE is supported and TOO_LOW_TEMP_EN is enabled).<br>0 : Unknown Temperature<br>1~250 : (this value - 80) degrees in Celsius.<br>(i.e.,-79 °C ~ 170 °C)<br>Others: Reserved | |

| ATTRIBUTES | | | | | | |
|---|---|---|---|---|---|---|
| IDN | Name | Access Property | Size | Type<br># Ind.<br># Sel. | MDV | Description | Notes |
| 20h | wExceptionEvent CheckCycle | Read/ Volatile | 2 byte | D | Device specific | Value to check the check cycle for exception events<br><br>0: Host Default Interval<br><br>1~65,000: 1ms per unit max 65000 ms<br><br>Others: Reserved | |

OPERATION METHOD OF HOST CONFIGURED TO CONTROL STORAGE DEVICE FOR PROCESSING EXCEPTIONS AND OPERATION METHOD OF STORAGE SYSTEM INCLUDING HOST AND STORAGE DEVICE

CROSS-REFERENCE TO RELATED APPLICATIONS

This application claims benefit of priority under 35 U.S.C. § 119 to Korean Patent Application No. 10-2023-0123398, filed on Sep. 15, 2023, in the Korean Intellectual Property Office, the disclosure of which is incorporated by reference herein in its entirety.

BACKGROUND

1. Field

The present disclosure relates generally to a semiconductor memory, and more particularly, to an operation method of a host configured to control a storage device and an operation method of a storage system.

2. Description of Related Art

A semiconductor memory may be classified as a volatile memory, which may lose data stored therein when a power is turned off, such as, but not limited to, a static random-access memory (SRAM) a dynamic random-access memory (DRAM), and the like. Alternatively or additionally, a semiconductor memory may be classified as a nonvolatile memory, which may retain data stored therein even when a power is turned off, such as, but not limited to, a flash memory, a phase-change random-access memory (PRAM), a magnetic random-access memory (MRAM), a resistive random-access memory (RRAM), a ferroelectric random-access memory (FRAM), and the like.

A flash memory may be used as a high-capacity storage medium. A storage device may refer to a device that may store data under control of a host device, such as, but not limited to, a computer, a smartphone, a smart pad, and the like. The storage device may include a device that may store data on a magnetic disk, such as, but not limited to, a hard disk drive (HDD). Alternatively or additionally, the storage device may include a device that may store data in a semiconductor memory (e.g., a nonvolatile memory) such as, but not limited to, a solid state drive (SSD), a memory card, and the like.

With the development of semiconductor manufacturing technologies, the size of content used in the storage device and the host device of the storage device may be increasing. As such, for example, an exception event may occur due to an excessive temperature increase in the storage device. Accordingly, there is a need for a storage system that may efficiently manage exception events.

SUMMARY

One or more example embodiments of the present disclosure provide an operation method of a host with improved performance and an operation method of a storage system, when compared to related storage systems.

According to an aspect of the present disclosure, an operation method of a host configured to control a storage device includes receiving, from the storage device, a first response universal flash storage (UFS) protocol information unit (UPIU) including first event occurrence information indicating an occurrence of a first exception event, receiving, from the storage device prior to an exception event check cycle elapsing, a second response UPIU including second event occurrence information indicating an occurrence of a second exception event, and preventing processing of the second exception event, based on the second exception event occurring prior to the exception event check cycle elapsing.

According to an aspect of the present disclosure, an operation method of a storage system includes sending, by a host of the storage system, a first command UPIU to a storage device of the storage system, sending, by the storage device to the host, a first response UPIU corresponding to the first command UPIU and including information about an occurrence of a first exception event, based on the first command UPIU, sending, by the host to the storage device, a second command UPIU, sending, by the storage device to the host, a second response UPIU corresponding to the second command UPIU and including information about an occurrence of a second exception event, based on the second command UPIU, and preventing, by the host, processing of the occurrence of the second exception event, based on an exception event check cycle not elapsing.

According to an aspect of the present disclosure, an operation method of a UFS host configured to control a UFS device includes confirming an exception event check cycle, receiving, from the UFS device, a first response UPIU including information about an occurrence of a first exception event and information about a type of the first exception event, checking the occurrence of the first exception event and the type of the first exception event, based on the first response UPIU, receiving, from the UFS device prior to the exception event check cycle elapsing, a second response UPIU including information about an occurrence of a second exception event and information about a type of the second exception event, and preventing processing of the second exception event, based on the second exception event occurring prior to the exception event check cycle elapsing.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 4 is a diagram depicting fields of attributes of a storage device, according to an embodiment;

FIGS. 5A and 5B are diagrams illustrating a temperature managing method of a storage device of FIG. 1, according to an embodiment;

DETAILED DESCRIPTION

Figure 1:
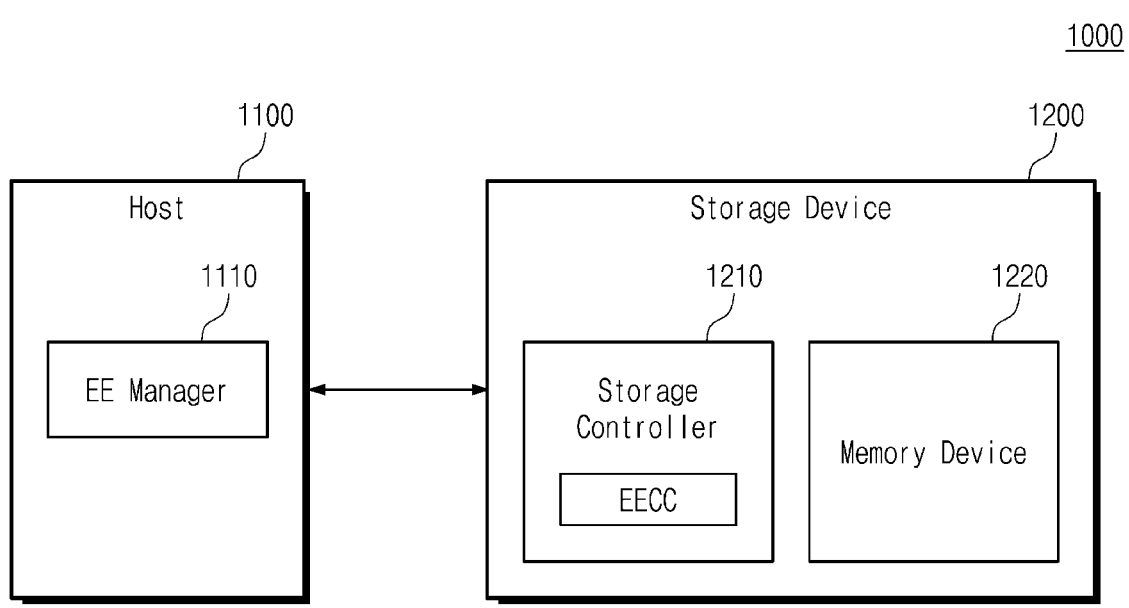
FIG. 1 is a block diagram illustrating a storage system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

According to a conventional universal flash storage (UFS) standard, a UFS host may receive a response UFS protocol information unit (UPIU) from a UFS device as a response to a command UPIU. A specific field (e.g., a device information field) of the response UPIU may include information about whether an exception event occurs in the UFS device. Whenever the UFS host receives the response UPIU, the UFS host may check the specific field (e.g., the device information field) of the response UPIU and may determine whether the exception event occurs in the UFS device. When the UFS host determines that the exception event occurs, the UFS host may send a query request UPIU for checking a type of the exception event to the UFS device.

For example, the UFS host may repeatedly receive the response UPIUs, which may provide notification that the same exception event occurs, from the UFS device. In this case, the UFS host may perform operations for independently handling the response UPIUs with regard to the exception event. However, the operations for handling the response UPIUs may include unnecessary operations. Due to the unnecessary operations, the overhead caused by the handling of the exception event may increase. As a result, the performance of a UFS system may be reduced.

According to embodiments of the present disclosure, when an exception event check cycle does not elapse a point in time when the response UPIU is received, the UFS host may not determine whether the exception event occurs. Accordingly, unnecessary operations that are performed during the handling of the response UPIU may be minimized, when compared to a related UFS system. The UFS host may check the exception event check cycle through an exception event check cycle (e.g., "wExceptionEventCheckCycle") field among attributes fields of the UFS device. Accordingly, a UFS system with potentially improved performance may be provided.

Hereinafter, various embodiments of the present disclosure are described with reference to the accompanying drawings.

FIG. 1 is a block diagram illustrating a storage system, according to an embodiment. Referring to FIG. 1, a storage system 1000 may include a host 1100 and a storage device 1200. In an embodiment, the storage system 1000 may include at least one of computing system such as, but not limited to, a ultra-mobile personal computer (UMPC), a workstation, a net-book, a personal digital assistant (PDA), a portable computer, a web tablet, a wireless phone, a mobile phone, a smartphone, an e-book, a portable multimedia player (PMP), a portable game player, a navigation device, a black box, a digital camera, a digital multimedia broadcasting (DMB) player, a digital audio recorder, a digital audio player, a digital picture recorder, a digital picture player, a digital video recorder, a digital video player, and the like.

The host 1100 may be configured to control the storage device 1200. For example, based on a given interface, the host 1100 may store data in the storage device 1200 and/or may read data stored in the storage device 1200. In an embodiment, the given interface may be and/or may include a UFS interface. However, the present disclosure is not limited thereto. For example, the given interface may include at least one of various interfaces such as, but not limited to, an advanced technology attachment (ATA) interface, a serial ATA (SATA) interface, an external SATA (e-SATA) interface, a small computer small interface (SCSI) interface, a serial attached SCSI (SAS) interface, a peripheral component interconnection (PCI) interface, a PCI express (PCIe) interface, a non-volatile memory (NVM) express (NVMe) interface, an Institute of Electrical and Electronics Engineers (IEEE) 1394 (FireWire) interface, an universal serial bus (USB) interface, a Secure Digital (SD) card interface, a multi-media card (MMC) interface, an embedded MMC (eMMC) interface, an UFS interface, an embedded UFS (eUFS) interface, a Compact Flash (CF) card interface, a Compute eXpress Link (CXL) interface, and the like.

The storage device 1200 may operate under control of the host 1100. In an embodiment, the storage device 1200 may be and/or may include a UFS device complying with a UFS interface standard. For example, the storage device 1200 may include a storage controller 1210 and a memory device 1220.

The storage controller 1210 may operate under control of the host 1100. For example, under control of the host 1100, the storage controller 1210 may store data in the memory device 1220 (e.g., write operations) and/or may provide data stored in the memory device 1220 to the host 1100 (e.g., read operations). In an embodiment, the storage controller 1210 may perform various management operations under control of the host 1100. In an embodiment, the management operations may include an operation of setting a variety of information of the storage device 1200, an operation of providing the variety of information set in the storage device 1200 to the host 1100, and the like.

The memory device 1220 may operate under control of the storage controller 1210. The memory device 1220 may be and/or may include a plurality of nonvolatile memories. In an embodiment, the plurality of nonvolatile memories included in the memory device 1220 may communicate with the storage controller 1210 through a plurality of channels and may form a plurality of ways. In an embodiment, the memory device 1220 may be implemented based on a NAND flash memory. However, the present disclosure is not limited thereto. For example, the memory device 1220 may be implemented based on at least one of various nonvolatile memory devices such as, but not limited to, a phase-change memory device (e.g., PRAM), a ferroelectric memory device (e.g., FRAM), a magnetic memory device (e.g., MRAM), a resistive memory device (e.g., RRAM), and the like.

In an embodiment, the host 1100 and the storage device 1200 may communicate based on a packet and/or message having a UFS protocol information unit (UPIU) format. The UPIU may include a variety of information defined by an interface (e.g., an UFS interface) between the host 1100 and the storage device 1200.

In an embodiment, the host 1100 may include an exception event (EE) manager 1110. The exception event manager 1110 may be configured to manage an exception event caused in the storage device 1200. In an embodiment, the exception event manager 1110 may manage the exception event based on an exception event check cycle (EECC).

The exception event may refer to an exception situation that may occur in the storage device 1200. For example, an exception event may occur in the storage device 1200 when the temperature of the storage device 1200 reaches a "too high temperature" (e.g., the temperature of the storage device 1200 exceeds a predetermined threshold temperature). Exception events are described in further detail below.

In an embodiment, the host 1100 may receive, from the storage device 1200, the response UPIU including event occurrence information indicating the occurrence of the exception event. In such an embodiment, if the EECC has not elapsed, the exception event manager 1110 may ignore the occurrence of the exception event. That is, the exception event manager 1110 may prevent processing of the exception event when the exception event is received prior to the EECC having elapsed. In an embodiment, information about the EECC may be stored in the storage controller 1210. In an embodiment, the storage controller 1210 may include a separate register configured to store information about the EECC. In an embodiment, the exception event manager 1110 may include a determination unit and a timer for determining whether the EECC has elapsed. However, the present disclosure is not limited in this regard, and the exception event manager 1110 may utilize other methods or techniques to determine whether the EECC has elapsed.

In an embodiment, the host 1100 may receive, from the storage device 1200, a first response UPIU. The first response UPIU may include first event occurrence information indicating that the first exception event occurs in the storage device 1200.

In such an embodiment, the exception event manager 1110 may determine whether the first exception event occurs in the storage device 1200, through the first response UPIU. When the exception event manager 1110 determines, through the first response UPIU, that the first exception event occurs, the exception event manager 1110 may perform an operation of checking a type of the first exception event. That is, the exception event manager 1110 may perform the operation of checking the type of the first exception event in response to the first event occurrence information.

In an embodiment, the host 1100 may receive, from the storage device 1200, a second response UPIU. The second response UPIU may include second event occurrence information indicating that the second exception event occurs in the storage device 1200.

In such an embodiment, when the EECC has not elapsed, the exception event manager 1110 may not determine whether the second exception event occurs. That is, the exception event manager 1110 may ignore (or prevent processing of) the occurrence of the second exception event. For example, the host 1100 may receive the second exception event from a point in time after the first query request UPIU for checking the type of the first exception event is sent and before the EECC elapses. In such an example, when the second response UPIU is received before the EECC has elapsed, the exception event manager 1110 may ignore the occurrence of the second exception event. Since the exception event manager 1110 prevents the processing of the occurrence of the second exception event, the overhead for handling the exception event may decrease.

Exception event managing operations, according to an embodiment, are described with reference to the following drawings.

Figure 2:
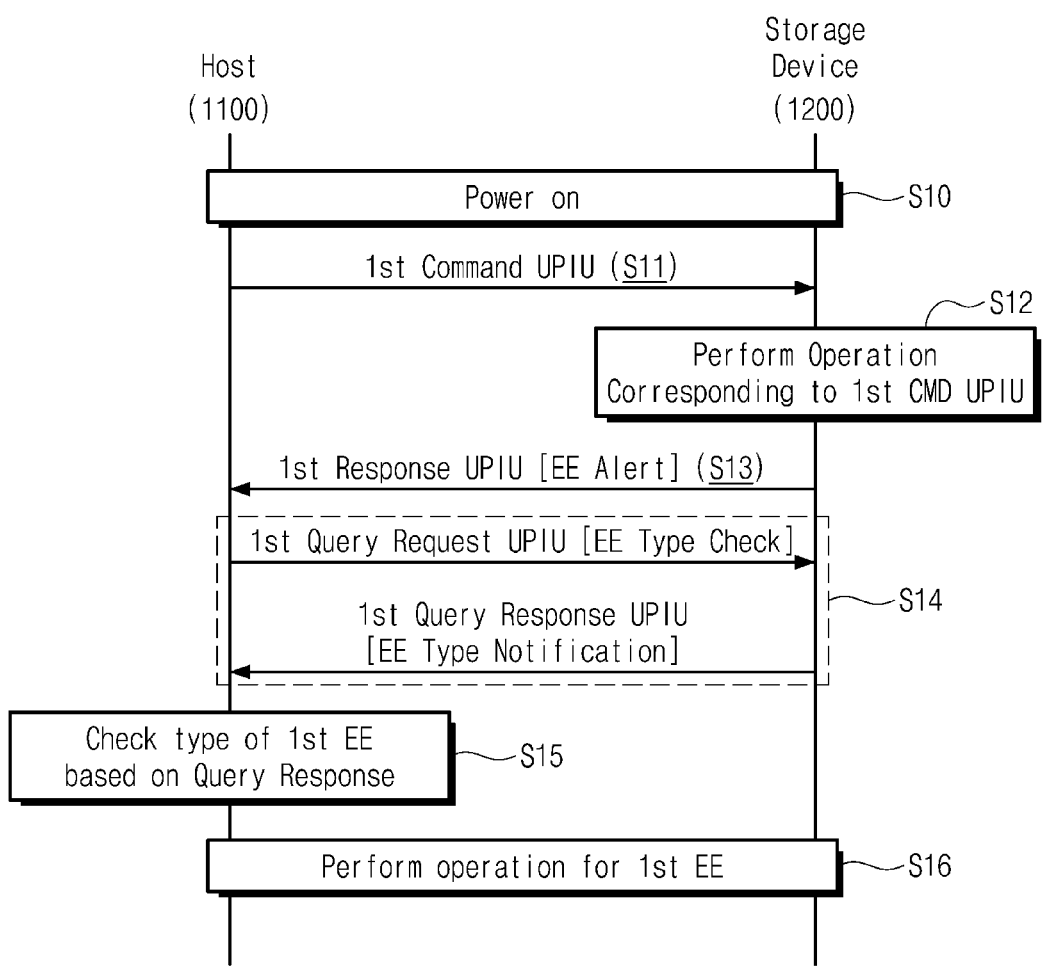
FIG. 2 is a flowchart depicting an example of an operation of a host of FIG. 1, according to an embodiment.

FIG. 2 is a flowchart depicting an example of an operation of a host of FIG. 1, according to an embodiment. FIG. 2 is described with reference to FIG. 1.

Referring to FIG. 2, in operation S10, the host 1100 and the storage device 1200 may be powered on. For example, the host 1100 and the storage device 1200 may perform a reset operation such as, but not limited to, a power-on reset operation, a hardware reset operation, an endpoint reset operation, and the like.

In operation S11, the host 1100 may send a first command UPIU (CMD UPIU) to the storage device 1200. The first command UPIU may refer to a signal allowing the storage device 1200 to perform a read and/or a write operation.

In operation S12, the storage device 1200 may perform an operation corresponding to the first command UPIU. For example, the storage device 1200 may perform the read operation and/or the write operation corresponding to the first command UPIU. In addition, the storage device 1200 may generate the first response UPIU including a result of the operation performed based on the first command UPIU and information about whether the first exception event occurs in the storage device 1200.

For example, the exception event may include one of exception events that are prescribed for the storage device 1200 such as, but not limited to, a dynamic device capacity, system pool exhausted, a background operation, a too high temperature, a too low temperature, performance throttling, and write booster buffer flush. However, the present disclosure is not limited thereto.

The dynamic device capacity exception event may refer to an exception event indicating that a dynamic capacity is needed in the storage device 1200. The system pool exhausted exception event may refer to an exception event indicating that a system resource for additional handling is insufficient in the storage device 1200. The background operation exception event may refer to an exception event indicating that attention is required with regard to the level necessary for the background operation in the storage device 1200. The too high temperature exception event and the too low temperature may refer to an exception events indicating that there is a need to adjust a temperature of the storage device 1200 to within an allowable range (e.g., below a maximum temperature threshold and/or above a minimum temperature threshold).

The performance throttling exception event may refer to an exception event indicating that the storage device 1200 may be operating with reduced performance. The write booster buffer flush exception event may refer to an exception event indicating that an operation of flushing data to the memory device 1220 of the storage device 1200 needs to be performed.

In operation S13, the storage device 1200 may send, to the host 1100, the first response UPIU as a response to the first command UPIU. In an embodiment, the first response UPIU may include information (e.g., EE Alert) about the occurrence of the exception event. The host 1100 may check the occurrence of the first exception event based on the first response UPIU.

In operation S14, the host 1100 and the storage device 1200 may perform operations for checking the type of the first exception event. For example, the host 1100 may send, to the storage device 1200, the first query request UPIU for checking the type of the first exception event. The first query request UPIU may refer to a signal for requesting information about attributes of the storage device 1200. The storage device 1200 may send, to the host 1100, a first query response UPIU in response to the first query request UPIU. The first query response UPIU may include information about the type of the first exception event.

For example, the query request UPIU and the query response UPIU may be used to send and/or receive information about descriptors, attributes, and flags, except for write data and read data to be exchanged between the host 1100 and the storage device 1200 through the command UPIU and the response UPIU.

In operation S15, the host 1100 may check the type of the first exception event. The host 1100 may check the type of the first exception event based on the first query response UPIU. For example, the first query response UPIU may include information indicating that the first exception event is the exception event associated with the too high temperature.

In operation S16, the host 1100 and the storage device 1200 may perform an operation for the first exception event. In an embodiment, the operation for the first exception event may refer to an operation of handling the first exception event.

In an embodiment, the operation for the first exception event may refer to an operation in which the host 1100 stores a first entry in a work queue of the host 1100. The first entry may correspond to the operation of handling the first exception event.

In an embodiment, the first exception event may be the too high temperature exception event. In such an embodiment, the operation of handling the first exception event may refer to operations for lowering the temperature of the storage device 1200 and/or adjusting the temperature of the storage device 1200 to be below the maximum allowed temperature threshold. In an embodiment, the operations for making the temperature of the storage device 1200 low may include an operation that terminates some applications under execution. For example, the operation that terminates some applications under execution may be performed by the host 1100.

In an embodiment, the first exception event may be the performance throttling exception event of the storage device 1200. In such an embodiment, the operation of handling the first exception event may include an operation of checking a throttling status (e.g., bThrotlingStatus) field of the attributes of the storage device 1200. For example, the operation of checking the throttling status field of the attributes of the storage device 1200 may be performed by the host 1100.

The operation for the first exception event is described with reference to FIG. 8.

Operations S11 to S16 described above may be repeatedly performed. For example, after performing the operation for the first exception event, the host 1100 may send a second command UPIU to the storage device 1200 (operation S11). The host 1100 may receive the second response UPIU from the storage device 1200 (operation S12). The second response UPIU may include information about the occurrence of the second exception event. The host 1100 may check the occurrence of the second exception event based on the second response UPIU and may check a type of the second exception event (operations S14 and S15). The host 1100 and the storage device 1200 may perform an operation for the second exception event (operation S16).

According to embodiments illustrated in FIG. 2, operations for checking a type of an exception event (e.g., the operations performed in operation S14) may be performed whenever the host 1100 receives, from the storage device 1200, the response UPIU that may include information indicating that an exception event occurs.

In an embodiment, the host 1100 may perform the operation of handling the first exception event based on the first response UPIU. In such an embodiment, the first exception event may be an event that may indicate a handling time during which the event needs to be handled (processed). For example, the host 1100 may receive the second response UPIU before the handling time for the first exception event elapses. The second response UPIU may include information about the occurrence of the second exception event. The second exception event may be an event whose type is the same as that of the first exception event.

In such an example, even though the operation of handling the first exception event is already performed, the host 1100 and the storage device 1200 may perform operations for checking the type of the second exception event based on the second response UPIU. As such, the operations for checking the type of the second exception event may be unnecessary operations. Consequently, the operations for checking the type of the second exception event may cause an increase in system overhead and potentially a reduction of performance of the storage system 1000.

Figure 3:
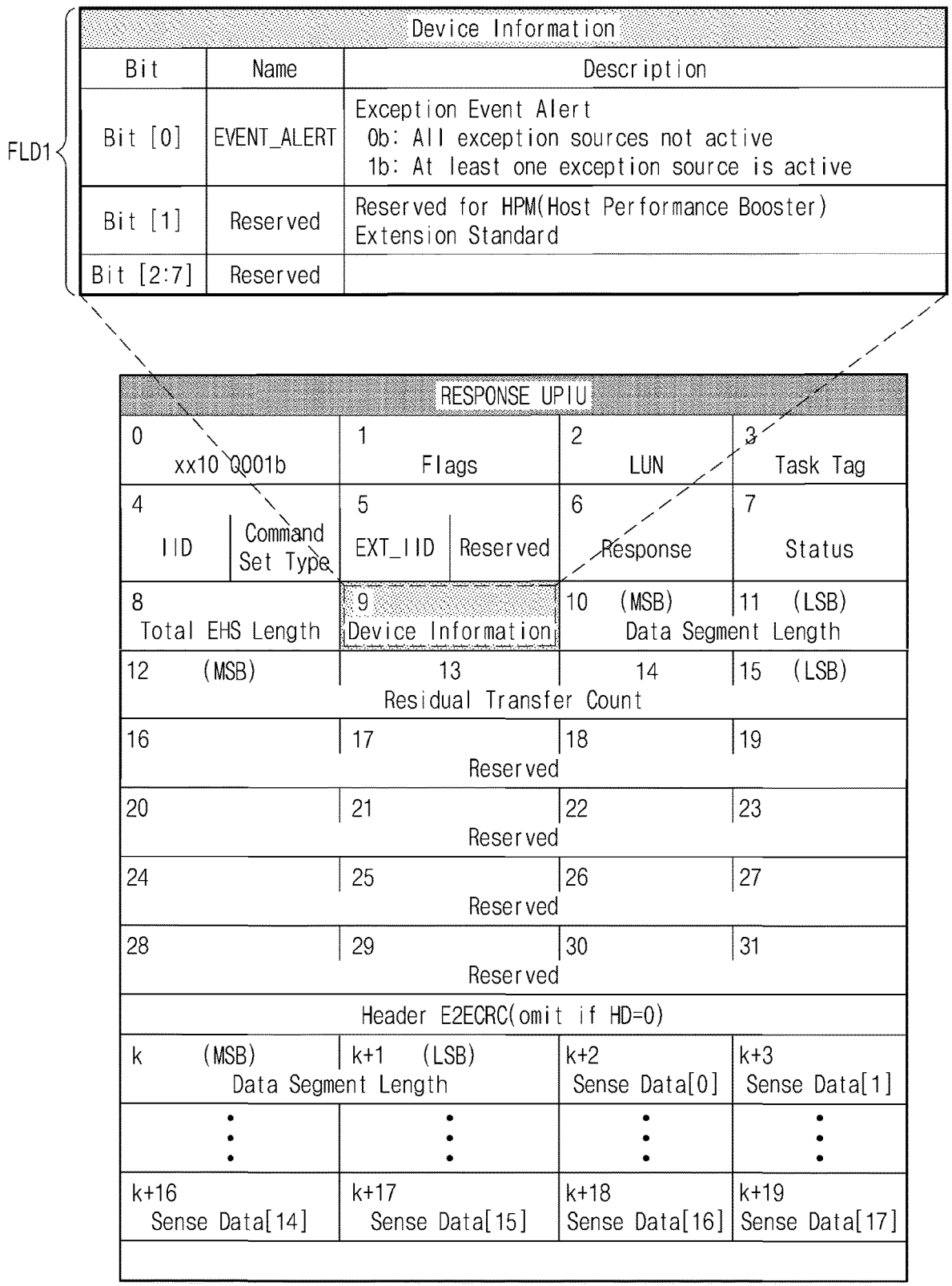
FIG. 3 is a diagram illustrating a response UPIU, according to an embodiment.

FIG. 3 is a diagram illustrating a response UPIU, according to an embodiment. Referring to FIG. 3, the response UPIU may include a plurality of fields. A device information field FLD1 from among the fields of the response UPIU may include information about whether the exception event occurs in the storage device 1200.

For example, when an event alert bit EVENT_ALERT (e.g., bit [0]) of the device information field FLD1 is "1", the response UPIU may include information indicating that the exception event occurs in the storage device 1200.

The host 1100 may determine whether the exception event occurs in the storage device 1200 by checking a setting value of the event alert bit EVENT_ALERT (e.g., bit [0]) of the device information field FLD1 of the response UPIU.

The response UPIU may only include information about whether the exception event occurs. That is, the response UPIU may not include information about a type of the exception event. As such, when the host 1100 determines, through the response UPIU, that the exception event occurs, the host 1100 may perform the operation of checking the type of the exception event.

FIG. 4 is a diagram depicting fields of attributes of a storage device, according to an embodiment. Referring to FIG. 4, the fields of the attributes of the storage device 1200 may include an exception event control field (e.g., wExceptionEventControl field) and an exception event status field (e.g., wExceptionEventStatus field).

The storage device 1200 may determine a setting value of the event alert bit EVENT_ALERT (e.g., bit [0]) of the device information field FLD1 (e.g., see FIG. 3) of the response UPIU based on the exception event control field and the exception event status field of the attributes.

The exception event control field may include information about the enabled exception event. The exception event status field may include information about the exception event caused in the storage device 1200.

For example, the temperature of the storage device 1200 may reach the "too high temperature" (e.g., exceed the maximum allowable temperature threshold) in a state where a specific bit (e.g., bit [3]) of the exception event control field is set to "1". In such an example, the storage device 1200 may set a specific bit (e.g., bit [3]) of the exception event status field to "1", and the storage device 1200 may set the event alert bit EVENT_ALERT (e.g., bit [0]) of the device information field FLD1 of the response UPIU to "1".

For example, the specific bit (e.g., bit [3]) of the exception event control field may be in a state of being set to "0". In such an example, the too high temperature exception event may be disabled. In an embodiment, the temperature of the storage device 1200 may reach the "too high temperature" threshold. In such an embodiment, the storage device 1200 may set the specific bit (e.g., bit [3]) of the exception event status field to "1". However, as the too high temperature exception event may be disabled, the storage device 1200 may set the event alert bit EVENT_ALERT (e.g., bit [0]) of the device information field FLD1 of the response UPIU to "0".

In an embodiment, a setting value of each of bits (e.g., bit [0] to bit [6]) of the exception event control field may be set by the host 1100.

That is, even though the storage device 1200 satisfies a specific condition in a state where an exception event associated with the specific condition is disabled, the host 1100 may not determine that the exception event occurs.

Through the event alert bit EVENT_ALERT (e.g., bit [0]) of the response UPIU that may be set to "1", the host 1100 may determine whether the exception event occurs in the storage device 1200. For example, the host 1100 may send, to the storage device 1200, the query request UPIU. The query request UPIU may refer to a signal for checking a type of an exception event. For example, to check the exception event status field of the attributes of the storage device 1200, the host 1100 may send, to storage device 1200, the query request UPIU.

The storage device 1200 may send, to the host 1100, the query response UPIU in response to the query request UPIU. The query response UPIU may include information about the type of the first exception event caused in the storage device 1200. That is, the query response UPIU may include first exception event type information indicating the type of the first exception event. For example, the query response UPIU may include the exception event status field of the attributes of the storage device 1200.

For example, the query response UPIU may include information indicating that a setting value of the specific bit (e.g., bit [3]) of the exception event status field is "1". Additionally, the too high temperature exception event may be the enabled exception event. That is, the specific bit (e.g., bit [3]) of the exception event control field may be in a state of being set to "1" by the host 1100. In such an example, the host 1100 may check that the first exception event is the too high temperature exception event, based on the query response UPIU.

Figure 5A:
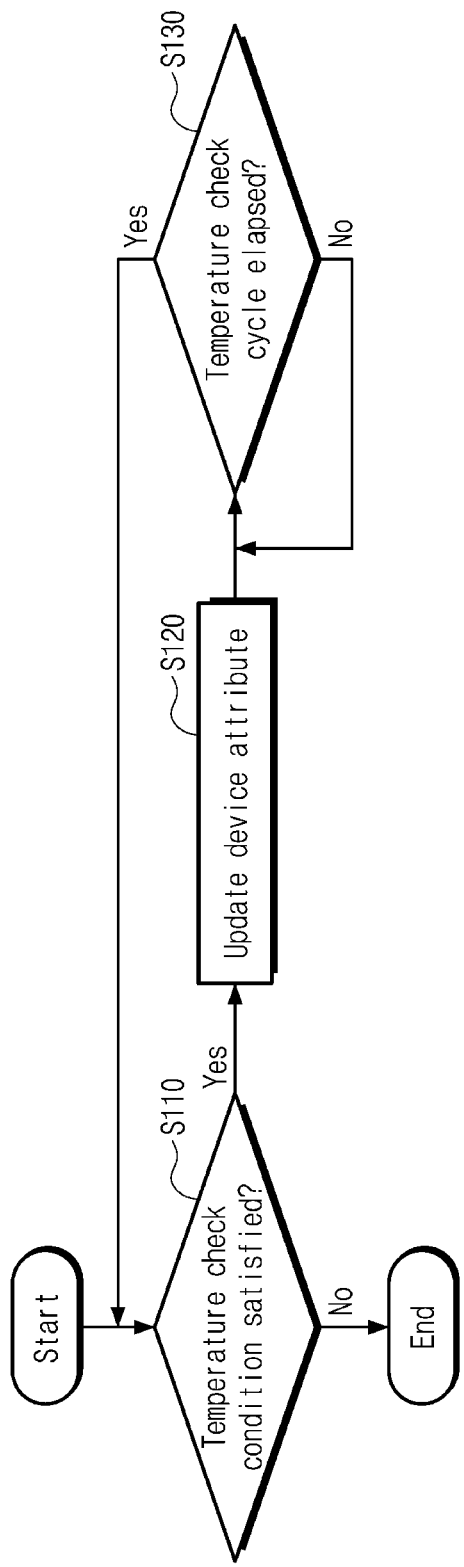

FIGS. 5A and 5B are diagrams illustrating an example of a temperature managing method of a storage device of FIG. 1, according to an embodiment. Referring to FIGS. 1 to 5B, in operation S110, the storage device 1200 may determine whether a temperature check condition is satisfied. When the storage device 1200 determines that the temperature check condition is satisfied, the storage device 1200 may perform operation S120.

For example, when the temperature of the storage device 1200 reaches the "too high temperature" (e.g., exceeds the maximum allowable temperature threshold) and the too high temperature exception event associated, the storage device 1200 may determine that the temperature check condition is satisfied. For example, when a specific bit (e.g., bit [3]) of the exception event control field of the attributes of the storage device 1200 is set to "1", the storage device 1200 may determine that the temperature check condition is satisfied.

As another example, when the temperature of the storage device 1200 reaches the "too low temperature" (e.g., is below the minimum allowable temperature threshold) and the too low temperature exception event is enabled, the storage device 1200 may determine that the temperature check condition is satisfied. For example, when a specific bit (e.g., bit [4]) of the exception event control field of the attributes of the storage device 1200 is set to "1", the storage device 1200 may determine that the temperature check condition is satisfied.

In operation S120, the storage device 1200 may update the attributes of the storage device 1200. For example, the storage device 1200 may update a setting value of a device temperature field (e.g., bDeviceCaseRoughTemperature field) of the attributes of the storage device 1200 so as to be changed to a value corresponding to a current temperature. The device temperature field may be configured as shown in FIG. 5B.

In operation S130, the storage device 1200 may determine whether a temperature check cycle elapses. For example, the storage device 1200 may determine whether the temperature check cycle elapses from a point in time when operation S120 (e.g., the update operation) is completed. When the storage device 1200 determines that the temperature check cycle elapses, the storage device 1200 may again perform operation S110. In an embodiment, the temperature check cycle may be about 100 milliseconds (ms).

Referring to FIGS. 5A and 5B, even though the temperature check condition is satisfied, the storage device 1200 may not change the device temperature field of the attributes of the storage device 1200 until the temperature check cycle elapses.

For example, as described with reference to FIG. 2, whenever the response UPIU is received, the host 1100 may check whether an exception event occurs. That is, the host 1100 may receive the first response UPIU before a first point in time. Subsequently, based on the first response UPIU, the host 1100 may check that the first exception event occurs. In addition, through the operations of sending the query request UPIU and receiving the query response UPIU, the host 1100 may check that the first exception event is the too high temperature exception event.

In an embodiment, at the first point in time, the storage device 1200 may update the attributes of the storage device 1200. For example, the storage device 1200 may update a setting value of the device temperature field of the attributes of the storage device 1200 to a value corresponding to a current temperature of the storage device 1200.

Subsequently, at a second point in time (e.g., after the first point in time), the host 1100 may perform an operation of lowering the temperature of the storage device 1200. At a third point in time (e.g., after the second point in time), the temperature of the storage device 1200 may be lower than the "too high temperature" (e.g., maximum allowable temperature threshold) by the temperature lowering operation performed by the host 1100.

At a fourth point in time (e.g., after the third point in time), the storage device 1200 may generate the second response UPIU. The fourth point in time may be a point in time when the temperature check cycle does not elapse from the first point in time. That is, even though the temperature of the storage device 1200 may be a normal temperature (e.g., within the allowable temperature range), the storage device 1200 may determine that the second too high temperature exception event occurs in the storage device 1200. As such, the storage device 1200 may generate the second response UPIU including information indicating that the second exception event occurs.

Subsequent to the fourth point in time, the host 1100 may receive the second response UPIU and may send the query request UPIU for checking the type of the second exception event. Additionally, the storage device 1200 may send the query response UPIU for providing notification that the second exception event is the too high temperature exception event.

That is, as described with reference to FIG. 2, even though the operation of handling an exception event is already performed, the host 1100 may receive the response UPIU providing notification that the same exception event occurs. In such an example, the host 1100 and the storage device 1200 may perform unnecessary operations for checking a type of the exception event. That is, even though the response UPIU including information about the occurrence of an abnormally recognized exception event is received, the host 1100 may perform an unnecessary operation to check the occurrence of the exception event. The unnecessary operations may cause the reduction of performance of the storage system 1000.

According to embodiments of the present disclosure, the host 1100 may not determine whether an exception event occurs, whenever the response UPIU is received. Accordingly, a storage system 1000 may be provided with potentially improved performance, when compared to related storage systems.

Figure 6A:
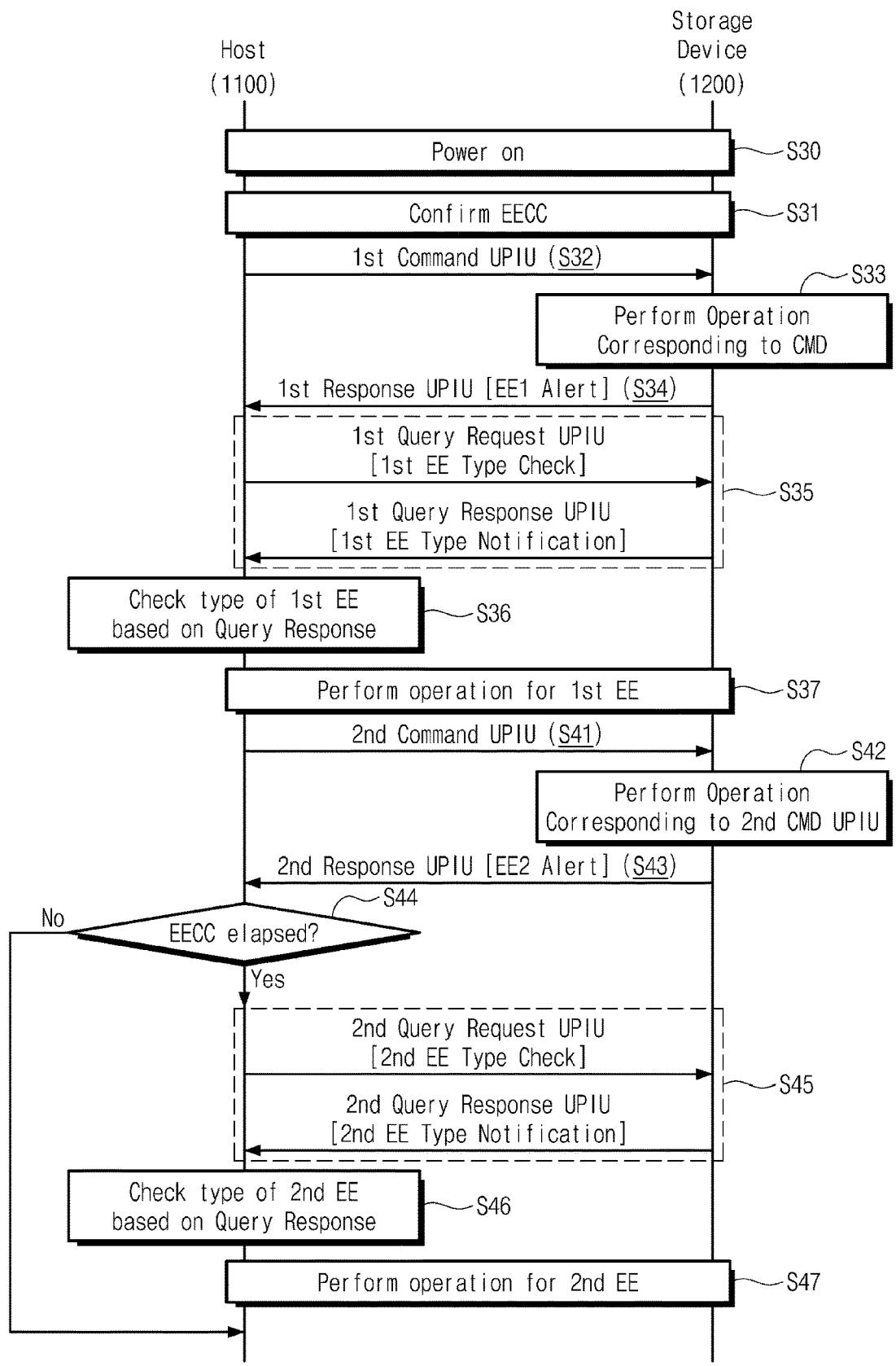
FIG. 6A is a diagram depicting an operation of a storage system of FIG. 1, according to an embodiment.

FIG. 6A is a diagram depicting an operation of a storage system of FIG. 1, according to an embodiment. FIG. 6A is described with reference to FIGS. 1 to 5B. Operations S30 and S32 to S37 of FIG. 6A may include and/or may be similar in many respects to the operations S10 and S11 to S16 described above with reference to FIG. 2, respectively, and may include additional features not mentioned above. Consequently, repeated descriptions of the operations S30 and S32 to S37 described above with reference to FIG. 2 may be omitted for the sake of brevity.

Referring to FIG. 6A, an operation of the storage system 1000 may include confirming the EECC (operation S31) and determining whether the EECC elapses (operation S44).

In operation S31, the storage system 1000 may confirm the EECC. That is, the host 1100 may confirm the EECC through a setting value of a specific field from among the fields of the attributes of the storage device 1200. For example, after the host 1100 is powered on, the host 1100 may confirm the EECC set in advance.

In operation S41, the host 1100 may send, to the storage device 1200, the second command UPIU. In operation S42, the storage device 1200 may perform an operation corresponding to the second command UPIU and may generate the second response UPIU.

In operation S43, the storage device 1200 may send the second response UPIU to the host 1100. The second response UPIU may include second event occurrence information (EE2 Alert) indicating the occurrence of the second exception event.

In operation S44, the host 1100 may determine whether the EECC elapses. According to an embodiment, the host 1100 may not determine whether an exception event occurs, whenever the response UPIU is received. After the second response UPIU is received, the host 1100 may determine whether the second exception event occurs, based on whether the EECC elapses.

In an embodiment, a point in time when the host 1100 receives the second response UPIU may follow a point in time when the EECC elapses from the point in time when the first query request UPIU is sent. In such an embodiment, the host 1100 may determine that the EECC elapses.

In an embodiment, a point in time when the host 1100 receives the second response UPIU may follow a point in time when the EECC elapses from the point in time when the first query response UPIU is received. In such an embodiment, the host 1100 may determine that the EECC elapses.

In an embodiment, a point in time when the host 1100 receives the second response UPIU may follow a point in time when the EECC elapses from the point in time when the first response UPIU is received. In such an embodiment, the host 1100 may determine that the EECC elapses.

When the EECC elapses, the host 1100 may determine whether the second exception event occurs. For example, the host 1100 may determine that the exception event occurs, by checking a setting value of the event alert bit EVENT_ALERT (e.g., bit [0]) of the device information field FLD1 (e.g., see FIG. 3) of the second response UPIU. After the host 1100 checks the occurrence of the second exception event, the host 1100 may perform operation S45.

When the EECC does not elapse, the host 1100 may ignore the second exception event. That is, when the EECC does not elapse, the host 1100 may not check the setting value of the event alert bit EVENT_ALERT (e.g., bit [0]) of the device information field FLD1 (e.g., see FIG. 3) of the second response UPIU. Additionally, the host 1100 and the storage device 1200 may not perform operations for checking a type of the second exception event.

In operation S45, the host 1100 and the storage device 1200 may perform the operations for checking the type of the second exception event. The host 1100 may send, to the storage device 1200, the second query request UPIU for checking the type of the second exception event. The storage device 1200 may send, to the host 1100, the second query response UPIU as a response to the second query request UPIU. The second query response UPIU may include information about the type of the second exception event. For example, the second query response UPIU may include second event type information indicating the type of the second exception event.

In operation S46, the host 1100 may check the type of the second exception event based on the second query response UPIU.

In operation S47, the host 1100 may perform an operation for the second exception event. In an embodiment, the operation for the second exception event may include an operation of adding a second entry to the work queue of the host 1100. The operation of adding the second entry to the work queue of the host 1100 may be performed by the host 1100. The second entry may correspond to the operation of handling the second exception event.

In an embodiment, the type of the second exception event may be the same as the type of the first exception event. Alternatively or additionally, the operation of handling the first exception event may not be performed at a point in time when the checking of the type of the second exception event (e.g., operation S45) is completely performed. In such an embodiment, the host 1100 may not add the second entry to the work queue. That is, the host 1100 may ignore (or prevent processing of) the second exception event. That is, an operation of handling the same exception event may be prevented from being repeatedly performed. Accordingly, the performance of the storage system 1000 may be potentially improved. The operation for the second exception event is described with reference to FIGS. 9A and 9B.

As described with reference to FIGS. 5A and 5B, even though an operation of handling an exception event is already performed, the host 1100 may receive the response UPIU including information indicating that the same exception event occurs. In such an embodiment, the host 1100 may ignore the occurrence of the exception event before the EECC elapses. Additionally, even though the host 1100 receives the response UPIU including information about the occurrence of an exception event abnormally recognized by the storage device 1200, the host 1100 may ignore the occurrence of the exception event before the exception event check cycle elapses. Accordingly, unnecessary operations associated with an exception event, which are performed in the storage system 1000, may be minimized, when compared to a related storage system.

In an embodiment, before the EECC elapses, the host 1100 may receive the response UPIU including information about the occurrence of the second exception event. In such an embodiment, the host 1100 may ignore the occurrence of the second exception event without determining whether the second exception event occurs.

In an embodiment, the host 1100 may send, to the storage device 1200, a third command UPIU. The host 1100 may receive a third response UPIU corresponding to the third command UPIU after the EECC elapses. The third response UPIU may include information about the occurrence of a third exception event. In such an embodiment, the host 1100 and the storage device 1200 may perform an operation for checking a type of the third exception event (e.g., operations S45 and S46) and an operation corresponding to the third exception event (e.g., operation S47). In an embodiment, the type of the third exception event may be the same as the type of the second exception event.

That is, even though the storage system 1000 ignores the second exception event, the storage system 1000 may handle the third exception event later, and thus, issues that may arise due to the ignoring of the second exception event may be prevented from occurring in the storage device 1200.

Figure 6B:
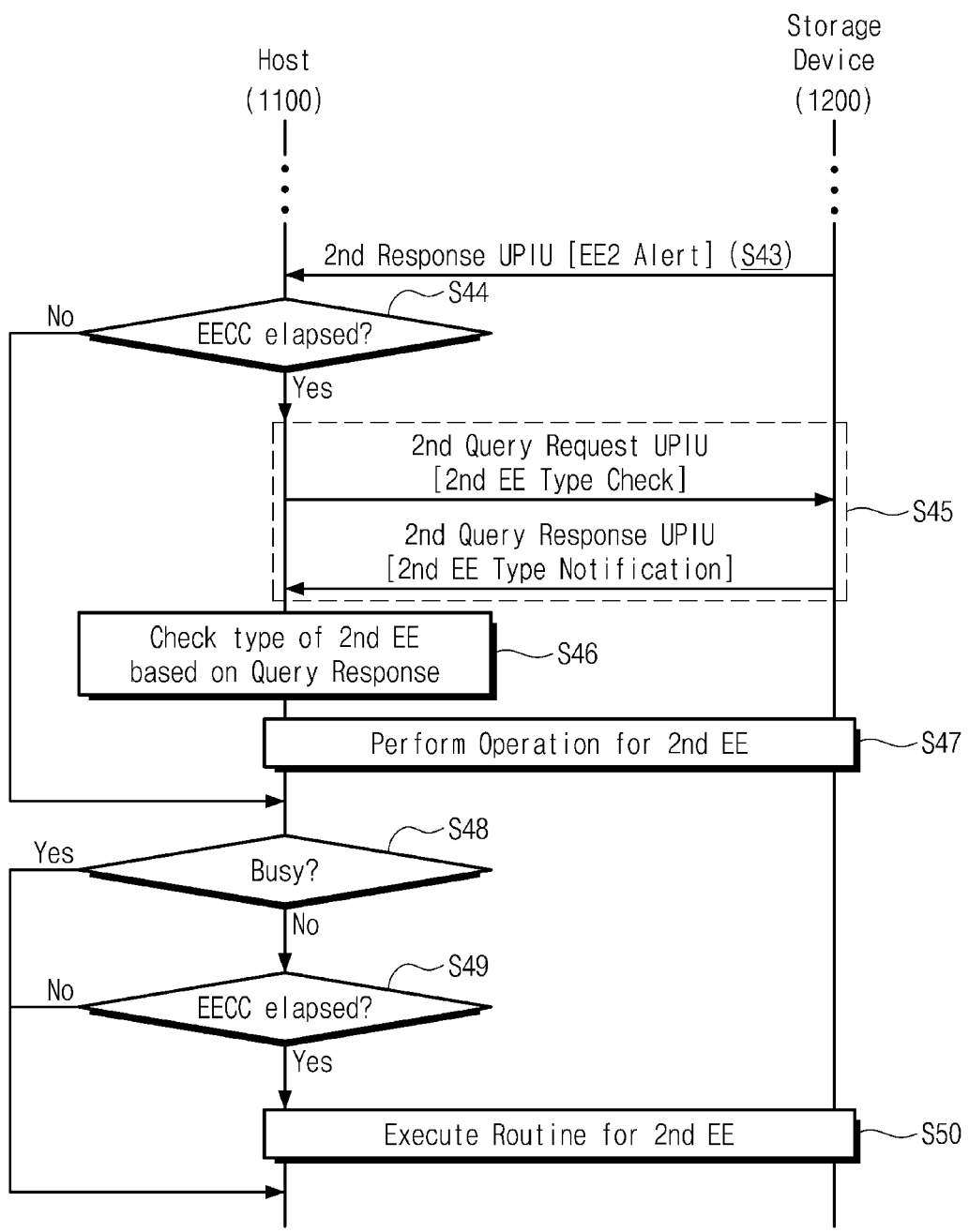
FIG. 6B is a diagram illustrating another example of an operation of a storage system of FIG. 1, according to an embodiment.

FIG. 6B is a diagram illustrating another example of an operation of a storage system of FIG. 1, according to an embodiment. FIG. 6B is described with reference to FIG. 6A. The operations of FIG. 6B may include and/or may be similar in many respects to the operations described above with reference to FIG. 6A, and may include additional features not mentioned above. Consequently, repeated descriptions of the operations of FIG. 6B described above with reference to FIG. 6A may be omitted for the sake of brevity.

Before operation S43, operations S30 to S37 described with reference to FIG. 6A may be performed.

For example, before the EECC elapses, the host 1100 may receive the second response UPIU (e.g., operation S43). The second response UPIU may include information indicating that the second exception event occurs in the storage device 1200. Even though the EECC does not elapse, the host 1100 may check the occurrence of the second exception event based on the second response UPIU.

However, before the EECC does not elapse, the operations of checking the type of the second exception event (e.g., operations S45 S46) and the operation for the second exception event (e.g., operation S47) may not be performed.

For example, in operation S44, when the EECC does not elapse, operation S48 may be performed.

In operation S48, the host 1100 may determine whether the host 1100 is in a busy state. For example, the host 1100 may perform a specific operation corresponding to an external request. In such an example, the host 1100 may determine that the state of the host 1100 is the busy state. When the host 1100 determines that the state of the host 1100 is the busy state, the host 1100 may perform the specific operation (e.g., an operation requested from the outside). When the host 1100 determines that the state of the host 1100 is not the busy state, the host 1100 may perform operation S49.

In operation S49, the host 1100 may again determine whether the EECC elapses. Even though the response UPIU is not received from the storage device 1200, the host 1100 may determine that the EECC elapses.

When the EECC elapses, the host 1100 and the storage device 1200 may perform a routine for the second exception event (operation S50). The routine for the second exception event may correspond to operations S45 to S47.

That is, as shown in FIG. 6B, when the host 1100 receives information about the occurrence of an exception event before the exception event check cycle elapses, the host 1100 may determine whether an exception event occurs. Additionally, after the exception event check cycle elapses, the host 1100 and the storage device 1200 may perform the routine for the second exception event even though the response UPIU is not received.

Figures 7A, 7B:
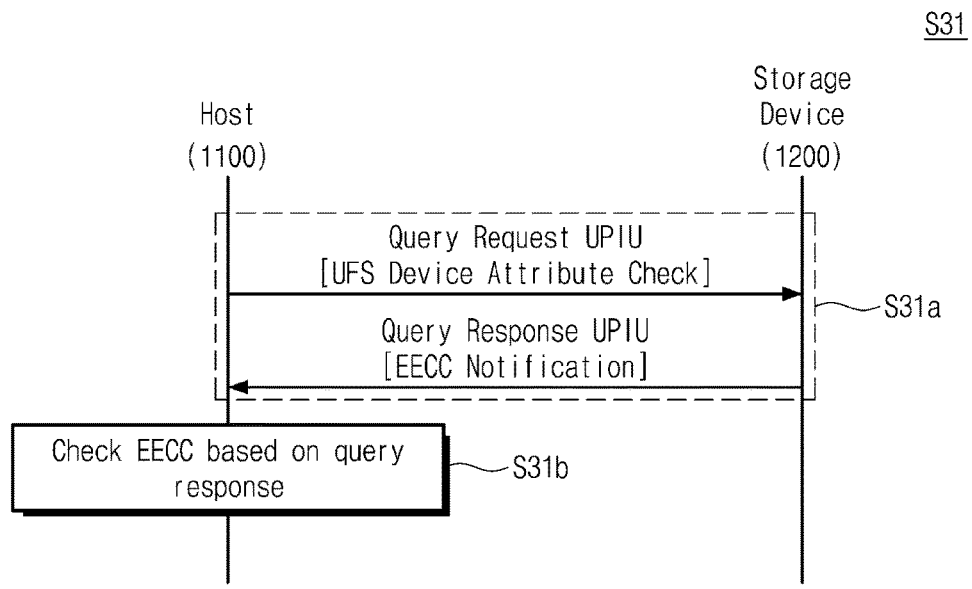
FIGS. 7A and 7B are diagrams depicting operation S31 of FIG. 6A, according to an embodiment.

FIGS. 7A and 7B are diagrams depicting operation S31 of FIG. 6A, according to an embodiment. FIGS. 7A and 7B are described with reference to FIG. 6A. Referring to FIG. 7A, in operation S31a, the host 1100 and the storage device 1200 may perform operations for confirming the EECC. For example, the host 1100 may send, to the storage device 1200, the query request UPIU. The query request UPIU may be and/or may include UPIU requesting information about the exception event check cycle field (e.g., wExceptionEventCheckCycle field) from among the attributes of the storage device 1200. The storage device 1200 may send, to the host 1100, the query response UPIU in response to the query request UPIU. The query response UPIU may include data of the exception event check cycle field.

In operation S31b, the host 1100 may confirm the EECC based on the query response UPIU.

The exception event check cycle field may be configured as shown in FIG. 7B. Referring to FIG. 7B, the fields of the attributes of the storage device 1200 may include the exception event check cycle field. For example, a setting value of the exception event check cycle field may be changed by the host 1100.

In FIG. 7B, an identifier number IDN of the exception event check cycle field is marked by "20h". However, the present disclosure is not limited thereto. In an embodiment, any one of reserved fields of the attributes of the storage device 1200 may be used as the exception event check cycle field.

Figure 8:
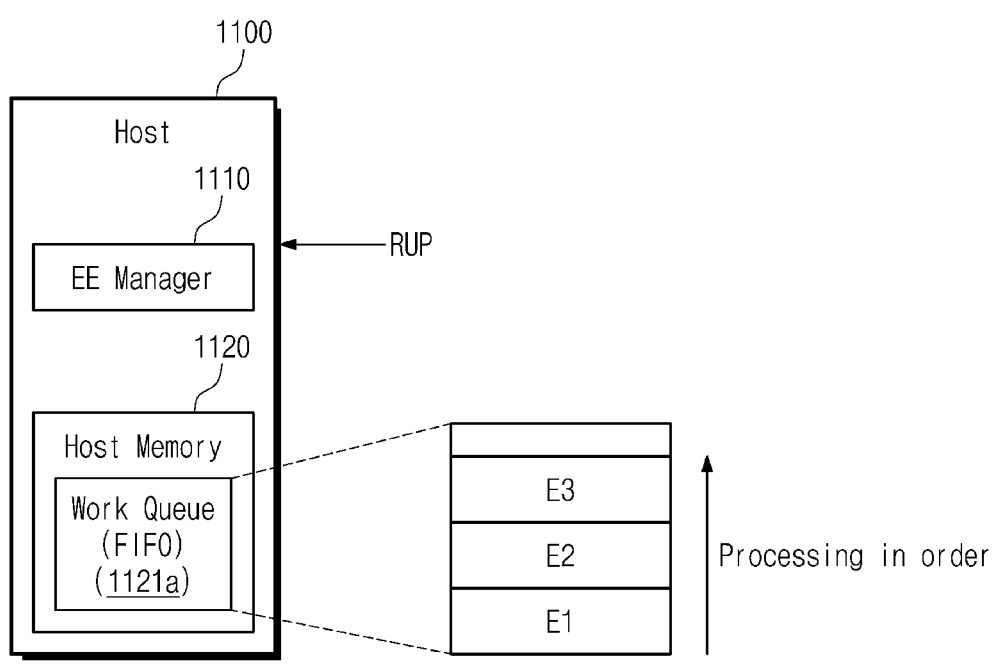
FIG. 8 is a diagram illustrating an example of an operation of a host of FIG. 1, according to an embodiment.

FIG. 8 is a diagram illustrating an example of an operation of a host of FIG. 1, according to an embodiment. Referring to FIG. 8, an example of an operation for an exception event, which may be performed by the host 1100, is illustrated. FIG. 8 is described with reference to FIGS. 1 and 2. As shown in FIG. 8, the host 1100 may include the exception event manager 1110 and a host memory 1120.

In an embodiment, the host memory 1120 may include a volatile memory such as, but not limited to, an SRAM and/or a DRAM. However, the present disclosure is not limited thereto. For example, the host memory 1120 may include a nonvolatile memory such as, but not limited to, a flash memory and/or a PRAM. The host memory 1120 may include a work queue 1121a. For example, the work queue 1121a may be and/or may include a queue that may be implemented in a first-in first-out (FIFO) scheme. The host 1100 may handle entries stored in the work queue 1121a in the FIFO scheme.

In an embodiment, the host 1100 may receive, from the storage device 1200, a response UPIU RUP including information about whether an exception event occurs. The host 1100 may check the occurrence of an exception event through the response UPIU RUP and may check a type of the exception event through a query UPIU. The host 1100 may perform an operation of handling the exception event.

For example, after checking the type of the exception event corresponding the response UPIU RUP, the host 1100 may not immediately perform the operation of handling the exception event due to the execution of any other operations (e.g., an operation requested from the outside). As such, the host 1100 may generate an entry E (e.g., first entry E1, second entry E2, third entry E3, and the like, hereinafter generally referred to as "E") corresponding to the operation of handling the exception event and may then store the entry E in the work queue 1121a. For example, when there is no need to perform any urgent operation, the host 1100 may check the entry E stored in the work queue 1121a and may handle the exception event. In an embodiment, the entry E may refer to a work structure.

In an embodiment, the host 1100 may receive a plurality of response UPIUs RUP during a specific time interval. In such an embodiment, due to the execution of other operations, the host 1100 may not immediately handle exception events corresponding to the response UPIUs RUP. Consequently, the host 1100 may store first to third entries E1 to E3 corresponding to operations of handling the exception events in the work queue 1121a. In an embodiment, the first entry E1 and the third entry E3 may be entries corresponding to the same operation. For example, each of the first entry E1 and the third entry E3 may correspond to an operation of handling a too high temperature exception event. As another example, the second entry E2 may correspond to an operation of handling a write booster buffer flush exception event.

For example, when the host 1100 does not quickly handle the write booster buffer flush exception event, the performance of the storage device 1200 may be significantly reduced. Accordingly, there may be a need to handle the write booster buffer flush exception event earlier than the too high temperature exception event. However, the host 1100 may process the entries E1 to E3 in a FIFO scheme, and as such, the handling of the write booster buffer flush exception event may be delayed. Thus, the performance of the storage device 1200 may be significantly reduced.

The host 1100 may receive the response UPIU RUP in a state where the first entry E1 corresponding to the operation of handling the too high temperature exception event is present in the work queue 1121*a*. In an embodiment, the response UPIU may include information about the occurrence of the too high temperature exception event. In such an embodiment, even though the first entry E1 is present in the work queue 1121*a*, the host 1100 may add the third entry E3 to the work queue 1121*a*. The third entry E3 may correspond to an operation of handling the too high temperature exception event.

Thus, after the host 1100 performs the operation corresponding to the first entry E1, the host 1100 may unnecessarily perform an operation of handling the third entry E3. In an embodiment, the operation corresponding to the third entry E3 may be the same as the operation corresponding to the first entry E1. As a result, the performance of the storage system 1000 may be reduced.

In an embodiment, the above operations of the host 1100 may be performed by the exception event manager 1110.

Figure 9A:
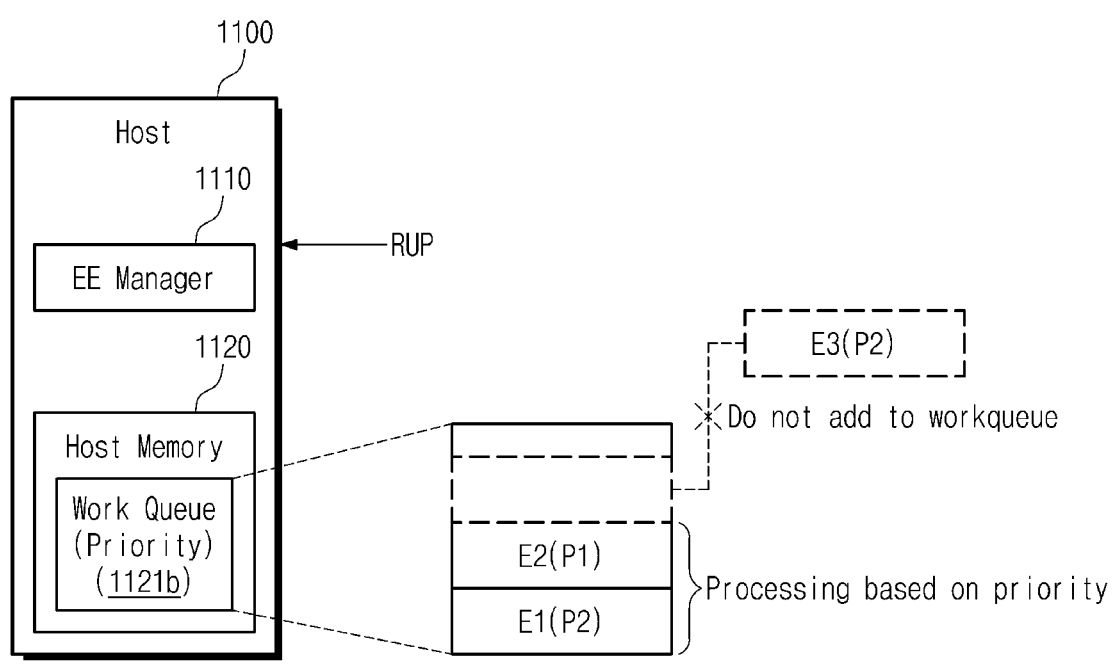
FIGS. 9A and 9B are diagrams depicting an operation of a host of FIG. 1, according to an embodiment.
Figure 9B:
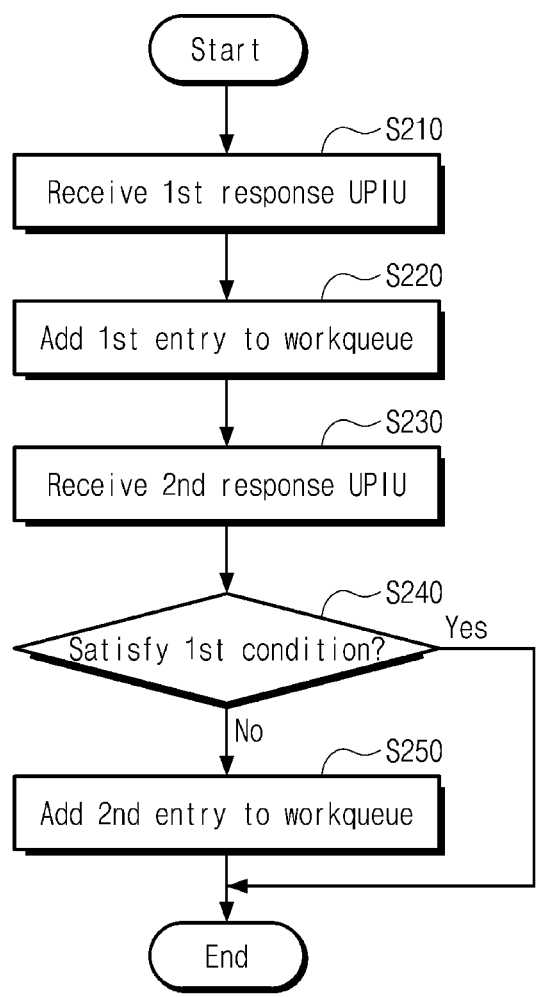

FIGS. 9A and 9B are diagrams depicting an operation of a host of FIG. 1, according to an embodiment. Referring to FIGS. 9A and 9B, an operation for an exception event, which may be performed by a host, is illustrated. FIGS. 9A and 9B are described with reference to FIGS. 1, 3, 4, and 6A to 8. As shown in FIG. 9A, the host 1100 may include the exception event manager 1110 and the host memory 1120. The host memory 1120 may include a work queue 1121*b*. The host 1100 may receive, from the storage device 1200, a response UPIU RUP including information about whether an exception event occurs. The operations of FIGS. 9A and 9B may include and/or may be similar in many respects to the operations described above with reference to FIG. 8, and may include additional features not mentioned above. Consequently, repeated descriptions of the operations of FIGS. 9A and 9B described above with reference to FIG. 8 may be omitted for the sake of brevity. FIGS. 9A and 9B are mainly described based on differences with FIG. 8.

In an embodiment, the work queue 1121*b* may be a priority queue unlike the work queue 1121*a* shown in FIG. 8. As described with reference to FIG. 8, the work queue 1121*b* may include entries (e.g., first entry E1, second entry E2, and third entry E3) corresponding to an operation of handling an exception event.

Unlike FIG. 8, the host 1100 may handle the entries (e.g., first entry E1 and second entry E2) of the work queue 1121*b* based on the priority of each of the entries.

For example, at a first point in time, the host 1100 may receive a first response UPIU. The first response UPIU may include information indicating that the second exception event occurs in the storage device 1200. The first exception event may be a too high temperature exception event. The host 1100 may generate the first entry E1 corresponding to an operation of handling the first exception event and may add the entry E1 to the work queue 1121*b*.

At a second point in time (e.g., after the first point in time), the host 1100 may receive a second response UPIU. The second response UPIU may include information indicating that the second exception event occurs in the storage device 1200. The second exception event may be a write booster buffer flush exception event. The host 1100 may generate the second entry E2 corresponding to an operation of handling the second exception event and may add the entry E2 to the work queue 1121*b*.

At a third point in time (e.g., after the second point in time), the host 1100 may receive a third response UPIU. The third response UPIU may include information indicating that the third exception event occurs in the storage device 1200. The third exception event may be the too high temperature exception event. In an embodiment, the first entry E1 may be still present in the work queue 1121*b*. Consequently, the host 1100 may not add the third entry E3 corresponding to an operation of handling the third exception event to the work queue 1121*b*.

That is, an entry (e.g., first entry E1) associated with an exception event (e.g., the first exception event) whose type is the same as a type of a current exception event (e.g., the third exception event) may be present in the work queue 1121*b*. In such an example, the host 1100 may not add an entry (e.g., a third entry) corresponding to an operation of handling the current exception event (e.g., the third exception event) to the work queue 1121*b*.

At a fourth point in time (e.g., after the third point in time), the host 1100 may handle the first entry E1 and the second entry E2. In an embodiment, a priority P1 of the second entry E2 may be higher than a priority P2 of the first entry E1. In such an embodiment, the host 1100 may handle the second entry E2 prior to the first entry E1. That is, the host 1100 may first perform an operation corresponding to the second entry E2 and may then perform an operation corresponding to the first entry E1, and thus, the first exception event and the second exception event may be handled.

According to an embodiment, the host 1100 may handle exception events based on priorities of the exception events. Alternatively or additionally, when the host 1100 receives the response UPIU providing notification that the occurrence of the second exception event of the same type before the handling of the first exception event, the host 1100 may ignore the second exception event. That is, the host 1100 may handle only the first exception event without handling the second exception event.

In an embodiment, the host 1100 may differently set a priority for each exception event type.

In an embodiment, a type of the first exception event may be associated with the temperature of the storage device 1200 and/or may be associated with the performance throttling of the storage device 1200. Additionally, a type of the second exception event may be different from the type of the first exception event. In an embodiment, the priority assigned to the second exception event may be higher than the priority assigned to the first exception event. In such an embodiment, the host 1100 may handle the second exception event prior to the first exception event. That is, the host 1100 may handle the entry (e.g., second entry E2) corresponding to the second exception event prior to the entry (e.g., first entry E1) corresponding to the first exception event.

In an embodiment, the above operations of the host 1100 may be performed by the exception event manager 1110.

FIG. 9B is a diagram depicting a method in which the host 1100 adds an entry to the work queue 1121*b*, with regard to FIG. 9A, according to an embodiment. Referring to FIG. 9B, in operation S210, the host 1100 may receive the first response UPIU. The first response UPIU may include information indicating that the first exception event occurs in the storage device 1200.

In operation S220, the host 1100 may add a first entry corresponding to an operation of handling the first exception event to the work queue 1121*b*.

In operation S230, the host 1100 may receive the second response UPIU. The second response UPIU may include information indicating that the second exception event occurs in the storage device 1200.

In operation S240, the host 1100 may determine whether a first condition is satisfied. For example, a type of the second exception event may be the same as a type of the first exception event. Alternatively or additionally, the first entry corresponding to the operation of handling the first exception event may be present in the work queue 1121b. In such an example, the host 1100 may determine that the first condition is satisfied. When the host 1100 determines that the first condition is satisfied (Yes in operation S240), the host 1100 may not add a second entry corresponding to an operation of handling the second exception event to the work queue 1121b. When the host 1100 determines that the first condition is not satisfied (No in operation S240), the host 1100 may add the second entry to the work queue 1121b.

In an embodiment, the performing of the operation for the first exception event of FIG. 6A (e.g., operation S37 of FIG. 6A) may include adding the first entry to the work queue 1121b (operation S220). Additionally, the performing of the operation for the first exception event of FIG. 6A (e.g., operation S47 of FIG. 6A) may include determining whether the first condition is satisfied (operation S240) and adding the second entry to the work queue 1121b (operation S250).

According to an embodiment, the host 1100 may handle exception events based on priorities of the exception events. Alternatively or additionally, the host 1100 may prevent the same exception event from being repeatedly processed. Accordingly, the performance of the storage system 1000 may be potentially improved, when compared to related storage systems.

Figure 10A:
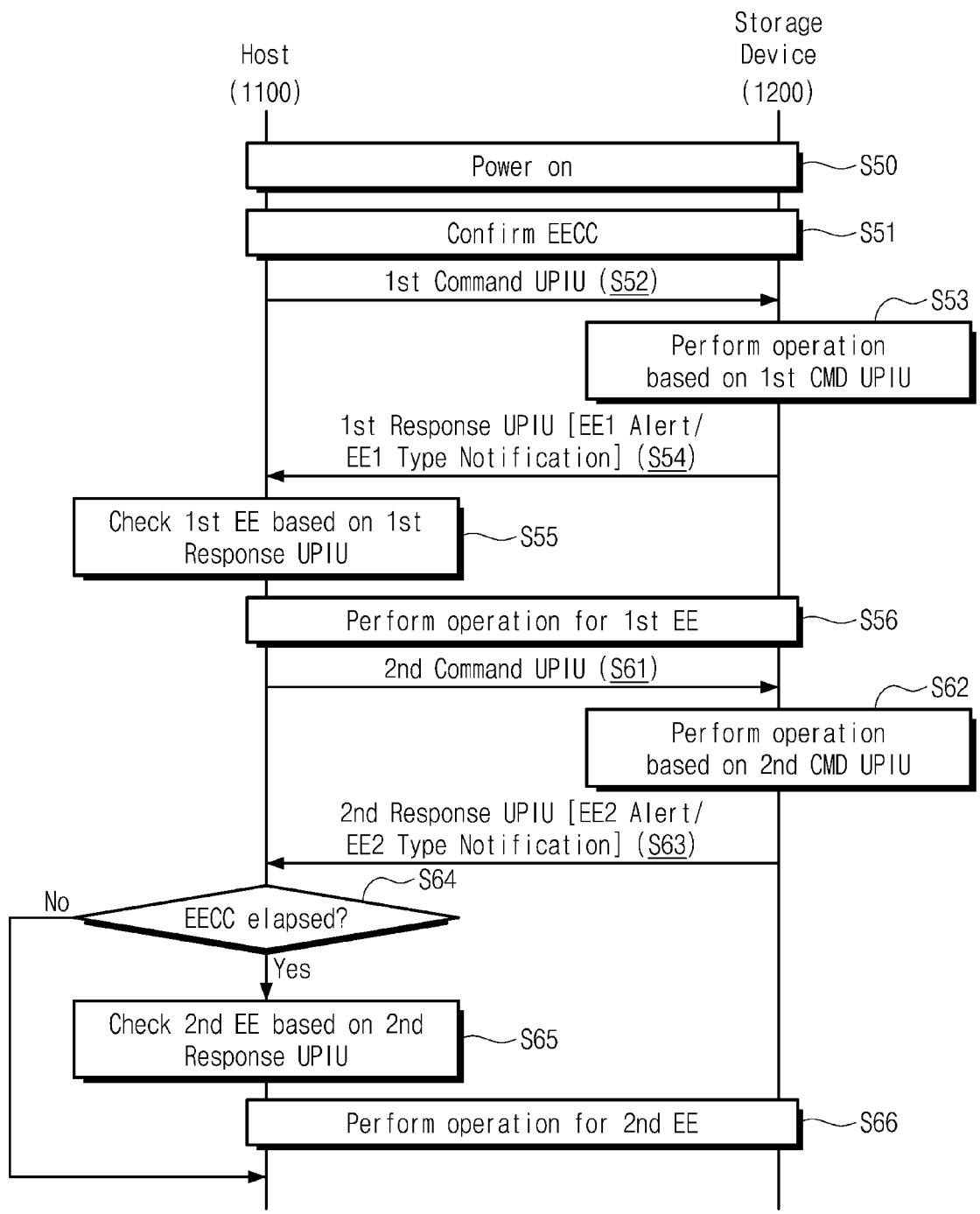
FIG. 10A is a diagram illustrating another example of an operation of a storage system of FIG. 1, according to an embodiment.

FIG. 10A is a diagram illustrating another example of an operation of a storage system of FIG. 1, according to an embodiment. FIG. 10A is described with reference to FIGS. 1 to 9B. Referring to FIG. 10A, in operation S50, the host 1100 and the storage device 1200 may be powered on. For example, the host 1100 and the storage device 1200 may perform a reset operation such as, but not limited to, a power-on reset operation, a hardware reset operation, an endpoint reset operation, and the like.

In operation S51, the storage system 1000 may confirm the EECC. For example, the host 1100 may read an exception event check cycle field of the attributes of the storage device 1200 and may confirm the EECC (e.g., through the query request UPIU).

In operation S52, the host 1100 may send, to the storage device 1200, the first command UPIU (CMD UPIU).

In operation S53, the storage device 1200 may perform an operation corresponding to the first command UPIU and may generate the first response UPIU.

In an embodiment, the storage device 1200 may generate the first response UPIU including information about whether the first exception event occurs and information about a type of the first exception event.

In operation S54, the storage device 1200 may send, to the host 1100, the first response UPIU.

In operation S55, through the first response UPIU, the host 1100 may determine whether the first exception event occurs and may check the type of the first exception event.

In operation S56, the host 1100 and the storage device 1200 may perform an operation for the first exception event. For example, the host 1100 may perform an operation of handling the first exception event. For example, the host 1100 may add an entry corresponding to the operation of handling the first exception event to the work queue 1121b (e.g., see FIG. 9A).

In operation S61, the host 1100 may send, to the storage device 1200, the second command UPIU (CMD UPIU).

In operation S62, the storage device 1200 may perform an operation corresponding to the second command UPIU and may generate the second response UPIU. The second response UPIU may include information about whether the second exception event occurs and information about a type of the second exception event.

In operation S63, the storage device 1200 may send, to the host 1100, the second response UPIU.

In operation S64, the host 1100 may determine whether the EECC elapses. For example, when a point in time when the second response UPIU is received follows a point in time when the EECC elapses from a point in time when the first response UPIU is received, the host 1100 may determine that the EECC elapses. When the EECC elapses (Yes in operation S64), the host 1100 may perform operation S65. When the EECC does not elapse (No in operation S64), the host 1100 may ignore (e.g., prevent processing) the second exception event.

In operation S65, based on the second response UPIU, the host 1100 may determine whether the second exception event occurs and may check the type of the second exception event.

In operation S66, the host 1100 and the storage device 1200 may perform an operation for the second exception event. For example, the operation for the second exception event may include and/or may be similar in many respects to the operations described with reference to FIGS. 6A, 9A, and 9B.

According to an embodiment, the response UPIU may also include information about a type of an exception event, in addition to information about whether an exception event occurs. Accordingly, the storage system 1000 may not additionally generate the query request UPIU and the query response UPIU for checking a type of an exception event. Accordingly, the storage system 1000 may potentially handle an exception event at a higher speed, when compared to a related storage system.

According to an embodiment, the host 1100 may determine whether an exception event occurs, based on the EECC. Accordingly, the host 1100 may ignore an unnecessary notification of an exception event. As a result, the overhead for the handling of an exception event may be reduced, when compared to a related storage system.

Figure 10B:
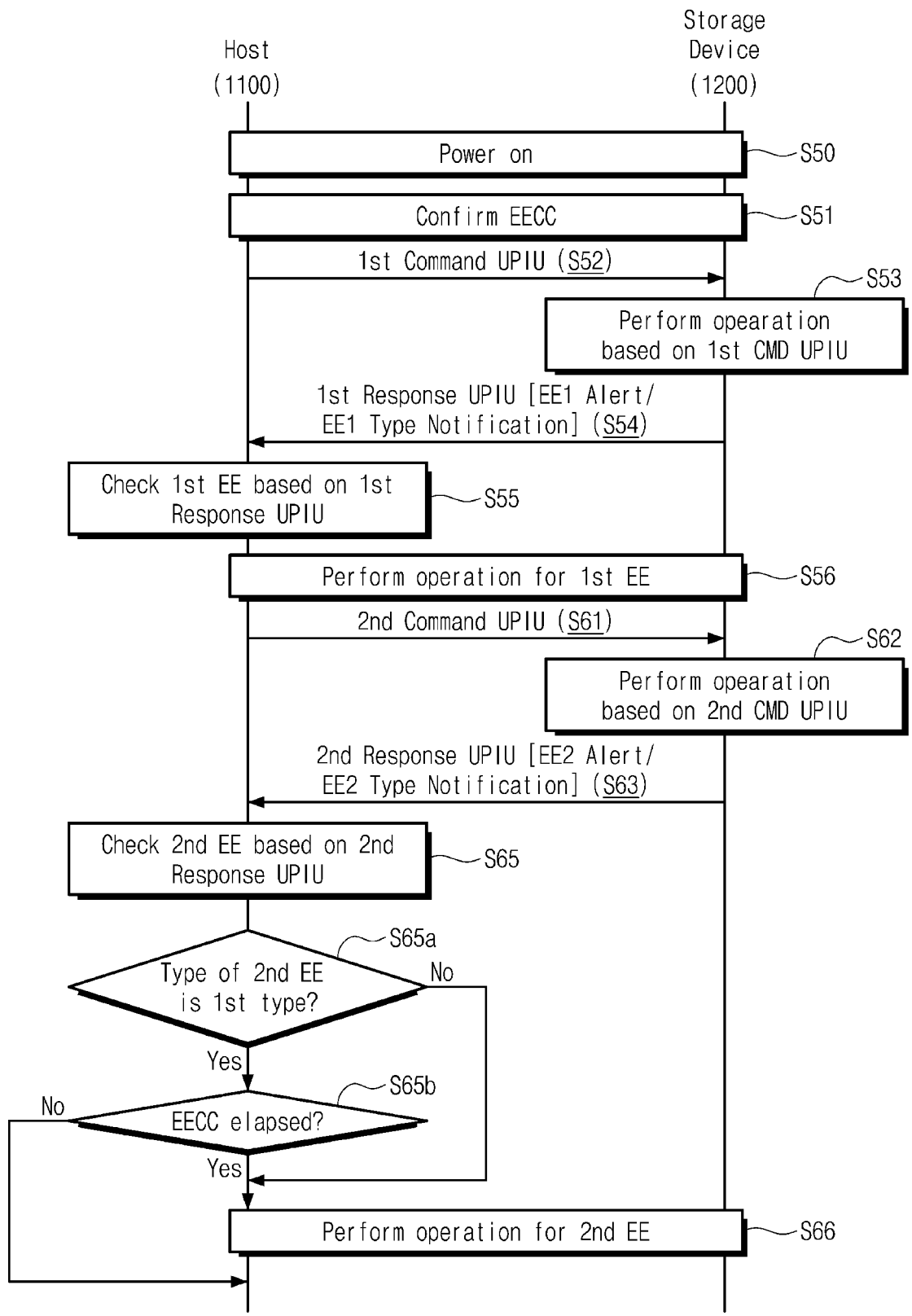
FIG. 10B is a diagram depicting another example of an operation of a storage system of FIG. 1, according to an embodiment.

FIG. 10B is a diagram depicting another example of an operation of a storage system of FIG. 1, according to an embodiment. The operations of FIG. 10B may include and/or may be similar in many respects to the operations described above with reference to FIG. 10A, and may include additional features not mentioned above. Consequently, repeated descriptions of the operations of FIG. 10B described above with reference to FIG. 10A may be omitted for the sake of brevity. Thus, FIG. 10B is mainly described based on differences with FIG. 10A.

Referring to FIG. 10B, after the second response UPIU is received (e.g., after operation S63), in operation S65, the host 1100 may check whether the second exception event occurs and the type of the second exception event, based on the second response UPIU.

In operation S65a, the host 1100 may determine whether the type of the second exception event is a first type. In an embodiment, the second exception event may be the too high temperature exception event, the too low temperature exception event, or the performance throttling exception event. In such an embodiment, the host 1100 may determine that the type of the second exception event is the first type (Yes in operation S65a). In an embodiment, the second exception event may not be the too high temperature exception event, may not be the too low temperature exception event, and may not be the performance throttling exception event. In such an embodiment, the host 1100 may determine that the second exception event does not correspond to the first type (No in operation S65a).

When the second exception event corresponds to the first type (Yes in operation S65a), the host 1100 may perform operation S65b. When the second exception event does not correspond to the first type (No in operation S65a), the host 1100 may perform operation S66.

In operation S65b, the host 1100 may determine whether the EECC elapses. When the EECC does not elapse (No in operation S65b), the host 1100 may ignore the second exception event. When the EECC elapses (Yes in operation S65b), the host 1100 may perform operation S66.

In operation S66, the host 1100 may perform an operation for the second exception event. For example, the operation for the second exception event may include and/or may be similar in many respects to the operations described with reference to FIGS. 6A, 9A, and 9B.

That is, according to an embodiment, when an exception event caused in the storage device 1200 requires urgent processing, the host 1100 may handle the exception event without determining whether the EECC elapses.

Figure 11:
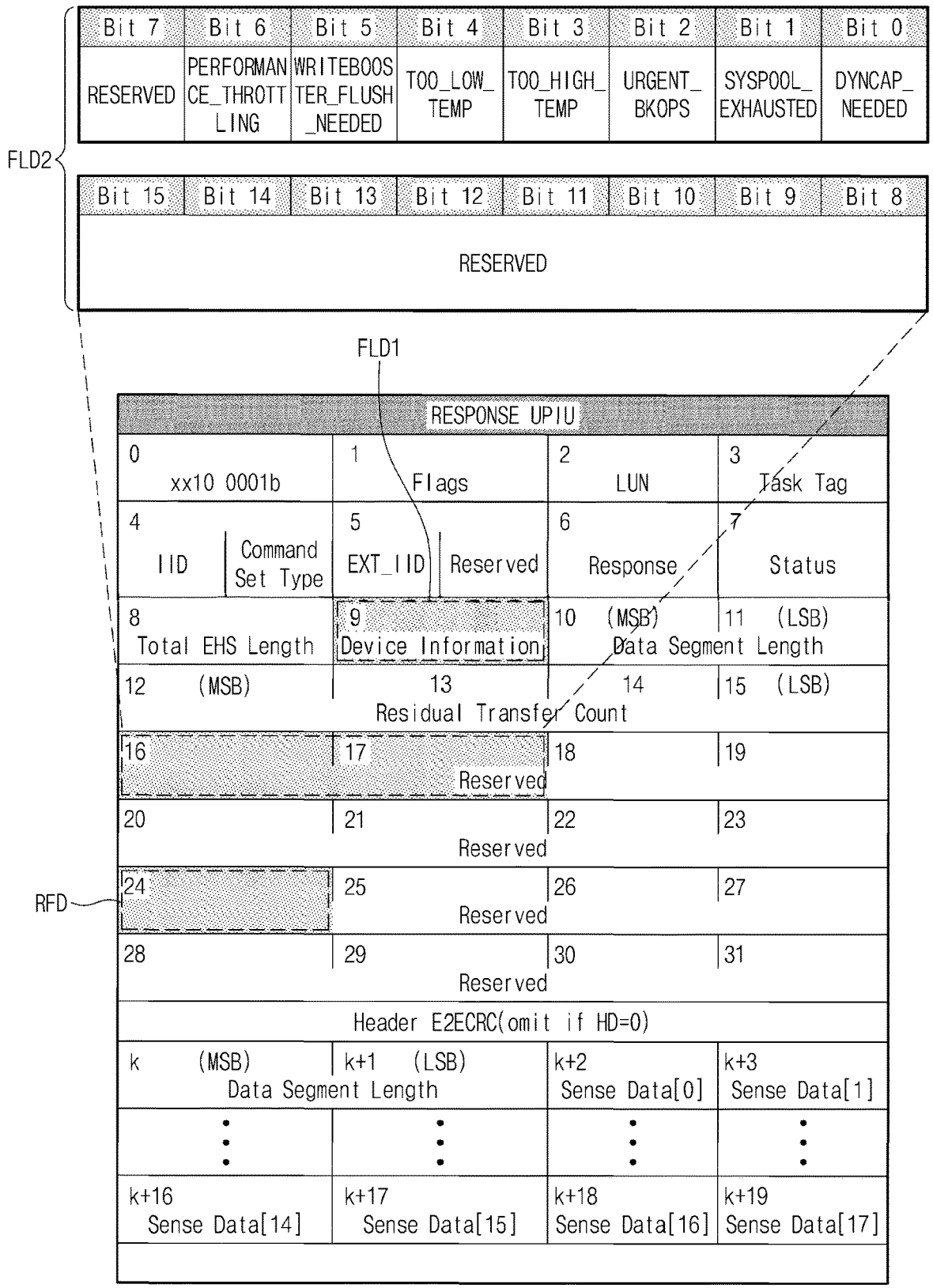
FIG. 11 is a diagram illustrating a response UPIU used in an operation described with reference to FIGS. 10A and 10B, according to an embodiment.

FIG. 11 is a diagram illustrating a response UPIU used in an operation, according to an embodiment, as described with reference to FIGS. 10A and 10B. FIG. 11 is described with reference to FIGS. 3, 10A, and 10B. Referring to FIG. 11, the response UPIU RUP may include the device information field FLD1 and a plurality of reserved fields RFD. In an embodiment, the number of reserved fields RFD may be 16. For example, among fields 0 to 31 of the response UPIU (RUP), each of fields 16 to 31 may be a reserved field (RFD).

The host 1100 may check the device information field FLD1 of the response UPIU and may determine whether an exception event occurs. That is, with reference to the event alert bit EVENT_ALERT (e.g., bit [0]) of the device information field FLD1, the host 1100 may determine whether the exception event occurs.

In an embodiment, the response UPIU may include an exception event type alert field FLD2. For example, the plurality of reserved fields RFD may include the exception event type alert field FLD2. As another example, the first reserved field and the second reserved field from among the plurality of reserved fields RFD may constitute the exception event type alert field FLD2.

A setting value of the exception event type alert field FLD2 may correspond to the setting value of the exception event status field (e.g., wExceptionEventStatus field) of the attributes of the storage device 1200. That is, setting values of bits (e.g., bit [0] to bit [6]) of the exception event type alert field FLD2 may correspond to the setting values of the bits (e.g., bit [0] to bit [6]) of the exception event status field of the attributes of the storage device 1200.

For example, when the temperature of the storage device 1200 reaches the "too high temperature" (e.g., exceeds the maximum allowable temperature threshold), the setting value of the bit (e.g., bit [3]) of the exception event status field of the attributes may be set to "1". Additionally, the setting value of the bit (e.g., bit [3]) of the exception event type alert field FLD2 may be set to "1". The too high temperature exception event may be in an enabled state. That is, the setting value of the specific bit (e.g., bit [3]) of the exception event control field (e.g., wExceptionEventControl field) of the attributes of the storage device 1200 may be set to "1".

In such an example, the setting value of the event alert bit EVENT_ALERT (e.g., bit [0]) of the device information field FLD1 of the response UPIU may be set to "1". The host 1100 may determine that an exception event occurs with reference to the device information field FLD1 of the response UPIU. The host 1100 may check the exception event type alert field FLD2 and may determine that the too high temperature exception event. That is, the host 1100 may check a type of an enabled exception event through the exception event type alert field FLD2.

According to an embodiment, some of the reserved fields RFD of the response UPIU may be defined as the exception event type alert field FLD2. Through the response UPIU, the host 1100 may check the type of the enabled exception event in addition to determining whether the exception event occurs. Accordingly, the number of times that there is generated the query UPIU for checking a type of an exception event may decrease. As a result, the storage system 1000 may handle exception events more quickly than a related storage system.

Figure 12:
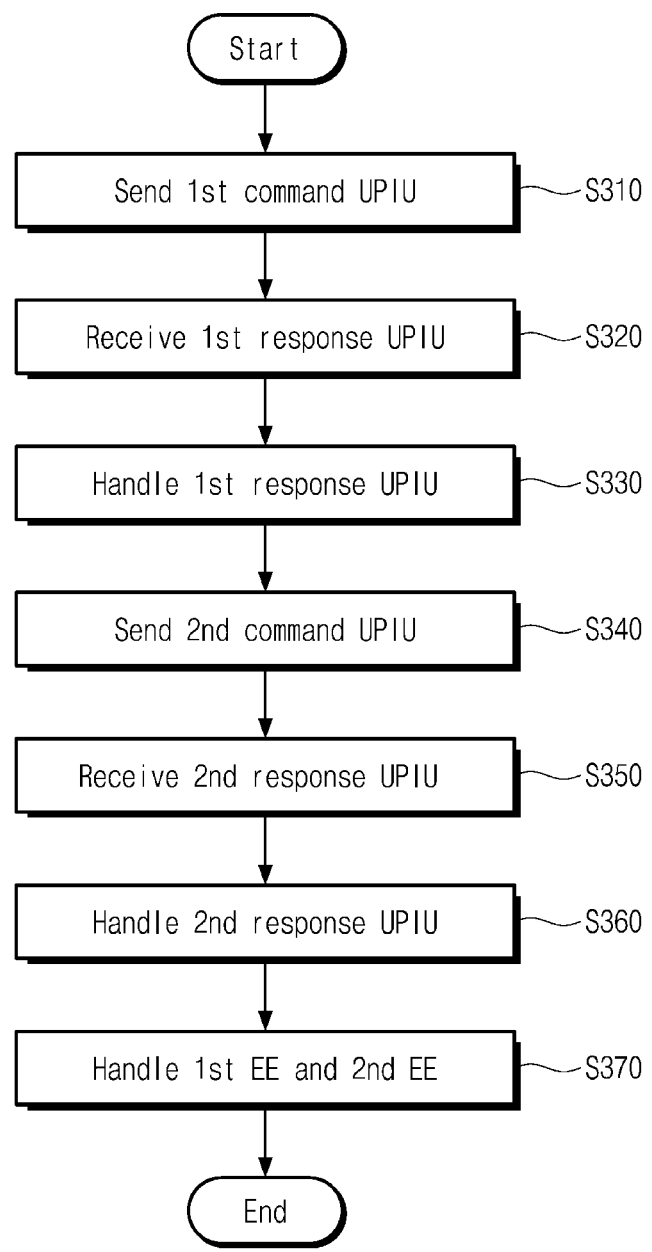
FIG. 12 is a diagram depicting an operation method of a host of FIG. 1, according to an embodiment.

FIG. 12 is a diagram depicting an operation method of a host of FIG. 1, according to an embodiment. FIG. 12 is described with reference to FIGS. 1, 3, 4, and 6A to 10B. Referring to FIG. 12, in operation S310, the host 1100 may send, to the storage device 1200, the first command UPIU.

In operation S320, the host 1100 may receive, from the storage device 1200, the first response UPIU. The first response UPIU may be a response signal to the first command UPIU. The first response UPIU may include information indicating that the first exception event occurs in the storage device 1200.

In operation S330, the host 1100 may handle the first response UPIU. For example, the host 1100 may check the occurrence of the first exception event based on the first response UPIU. The host 1100 may send, to the storage device 1200, the first query request UPIU and may check a type of the first exception event through the process of receiving, from the storage device 1200, the first query response UPIU. The host 1100 may perform an operation for the first exception event. For example, the operation for the first exception event may include adding an entry corresponding to the operation of handling the first exception event to a priority work queue (e.g., work queue 1121b of FIG. 9A) of the host 1100.

In an embodiment, the first response UPIU may further include information about the type of the first exception event. In such an embodiment, the host 1100 may send the query request UPIU and may check the type of the first exception event without the process of receiving the query response UPIU. For example, the host 1100 may check the type of the first exception event with reference to the exception event type alert field (e.g., FLD2 of FIG. 11) of the first response UPIU.

In operation S340, the host 1100 may send, to the storage device 1200, the second command UPIU.

In operation S350, the host 1100 may receive, from the storage device 1200, the second response UPIU. The second response UPIU may be a response signal to the second command UPIU sent from the host 1100 to the storage device 1200. The second response UPIU may include information indicating that the second exception event occurs in the storage device 1200.

In operation S360, the host 1100 may handle the second response UPIU. For example, the host 1100 may check the occurrence of the second exception event based on the EECC and the second response UPIU.

The host 1100 may send, to the storage device 1200, the query request UPIU and may check a type of the second exception event through the process of receiving the query response UPIU from the storage device 1200. The host 1100 may perform an operation for the second exception event. For example, the operation for the second exception event may include adding an entry corresponding to the operation of handling the second exception event to a work queue (e.g., work queue 1121*b* of FIG. 9A) of the host 1100.

In an embodiment, the second response UPIU may further include information about the type of the second exception event. In such an embodiment, the host 1100 may send the query request UPIU and may check the type of the second exception event without the process of receiving the query response UPIU. For example, the host 1100 may check the type of the second exception event with reference to the exception event type alert field (e.g., FLD2 of FIG. 11) of the second response UPIU.

In operation S370, the host 1100 may handle the first exception event and the second exception event. The host 1100 may handle the entries stored in the work queue (e.g., work queue 1121*b* of FIG. 9A) based on a priority of each of the entries. For example, the host 1100 may handle an exception event by performing an operation corresponding to an entry stored in the work queue (e.g., work queue 1121*b* of FIG. 9A).

Figure 13:
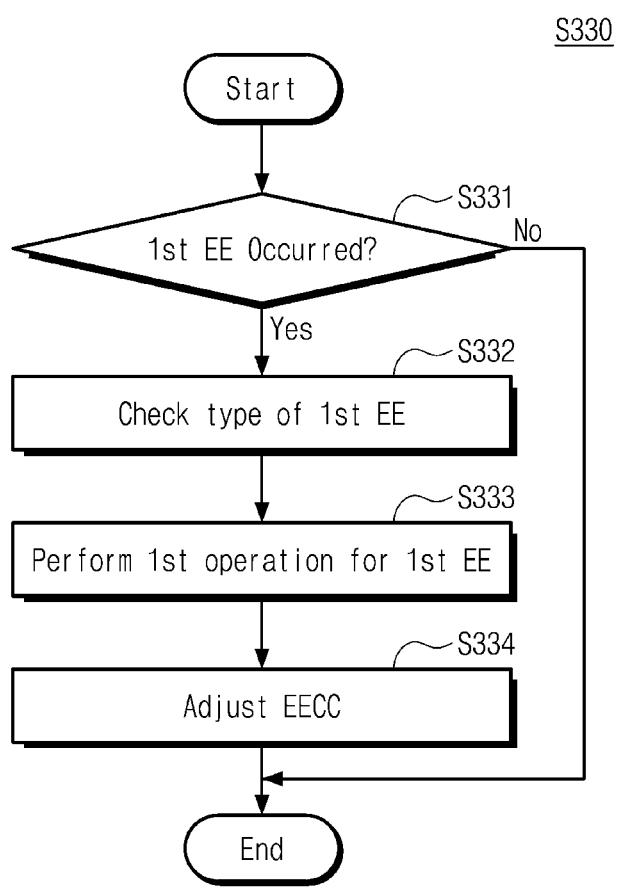
FIG. 13 is a diagram illustrating operation S330 of FIG. 12, according to an embodiment.

FIG. 13 is a diagram illustrating operation S330 of FIG. 12, according to an embodiment. In operation S331, the host 1100 may determine whether the first exception event occurs. For example, the host 1100 may determine whether the first exception event occurs, by checking a setting value of the event alert bit EVENT_ALERT (e.g., bit [0]) of the device information field FLD1 (e.g., see FIGS. 3 and 11) of the first response UPIU. For example, the setting value of the event alert bit EVENT_ALERT (e.g., bit [0]) of the device information field FLD1 of the first response UPIU may be "1". In such an example, the host 1100 may determine that the first exception event occurs in the storage device 1200 (Yes in operation S331). Alternatively, the host 1100 may determine that the first exception event has not occurred (No in operation S331), and terminate execution of operation S330.

In operation S332, the host 1100 may check a type of the first exception event. In an embodiment, the first response UPIU may not include information about the type of the first exception event. In such an embodiment, the host 1100 may send the first query request UPIU. The host 1100 may receive, from the storage device 1200, the first query response UPIU to the first query request UPIU. For example, the first query request UPIU may be a signal for checking the exception event status field (e.g., wExceptionEventStatus field) of the attributes of the storage device 1200.

In an embodiment, when the first response UPIU includes information about the type of the first exception event, the host 1100 may check the type of the first exception event with reference to an exception event type alert field (e.g., FLD2 of FIG. 11) of the first response UPIU without sending the first query request UPIU.

In operation S333, the host 1100 may perform a first operation for the first exception event. For example, the first operation may be an operation of handling the first exception event. As another example, the first operation may include adding a first entry corresponding to the operation of handling the first exception to a work queue (e.g., work queue 1121*b* of FIG. 9A).

In operation S334, the host 1100 may adjust the EECC. For example, the type of the first exception event may be a too high temperature exception event, a too low temperature exception event, or a performance throttling exception event. Alternatively or additionally, at a point in time when the first response UPIU is received, the EECC may have a default value. For example, the default value of the EECC may be zero (0) seconds. In such an example, the host 1100 may increase the EECC.

In an embodiment, the host 1100 may send the query request UPIU for changing the EECC. The query request UPIU may be a signal for changing a setting value of the exception event check cycle field (e.g., wExceptionEventCheckCycle field of FIG. 7B) of the attributes of the storage device 1200. The storage device 1200 may change the EECC in response to the query request UPIU. The storage device 1200 may change the setting value of the exception event check cycle field of the attributes of the storage device 1200 in response to the query request UPIU.

According to an embodiment, when an exception event associated with a temperature or a performance throttling exception event occurs in the storage device 1200, the host 1100 may increase the EECC.

Figure 14:
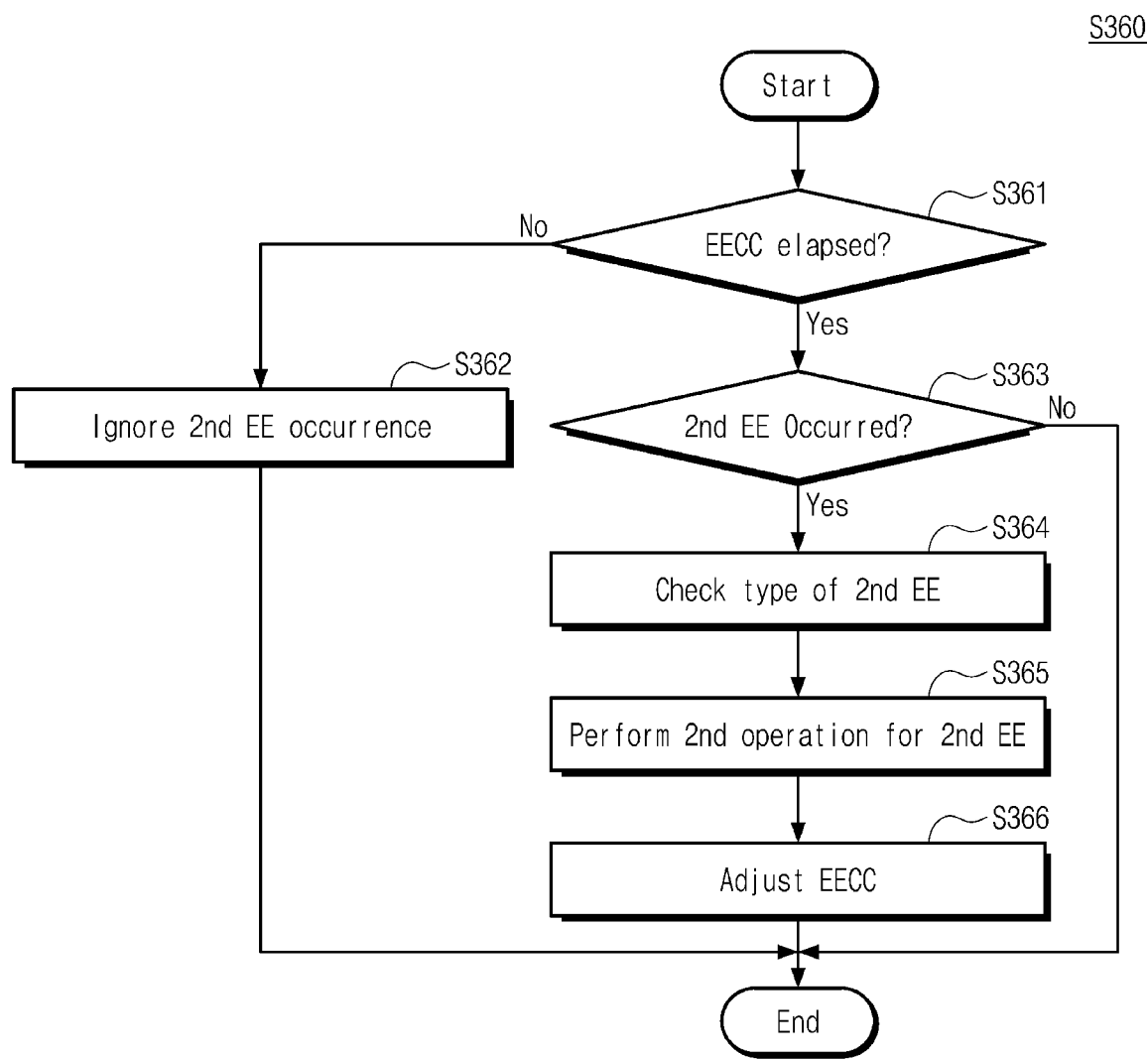
FIG. 14 is a diagram depicting operation S360 of FIG. 12, according to an embodiment.

FIG. 14 is a diagram depicting operation S360 of FIG. 12, according to an embodiment. In operation S361, the host 1100 may determine whether the EECC elapses. For example, a point in time when the host 1100 receives the second response UPIU may follow a point in time when the EECC elapses from a point in time when the host 1100 sends the first query request UPIU. In an embodiment, the first query request UPIU may refer to a signal for checking a type of the first exception event. In such an embodiment, the host 1100 may determine that the EECC elapses.

For example, a point in time when the host 1100 receives the second response UPIU may follow a point in time when the EECC elapses from a point in time when the host 1100 receives the first response UPIU. In such an example, the host 1100 may determine that the EECC elapses.

When the EECC does not elapse (No in operation S361), the host 1100 may perform operation S362. When the EECC elapses (Yes in operation S361), the host 1100 may perform operation S363.

In operation S362, the host 1100 may ignore the occurrence of the second exception event. That is, the host 1100 may not check a setting value of the event alert bit EVENT_ALERT (e.g., bit [0]) of the device information field FLD1 (e.g., see FIGS. 3 and 11) of the second response UPIU.

In operation S363, the host 1100 may determine whether the second exception event occurs. For example, when the setting value of the event alert bit EVENT_ALERT (e.g., bit [0]) of the device information field FLD1 (e.g., see FIGS. 3 and 11) of the second response UPIU is "1", the host 1100 may determine that the second exception event occurs in the storage device 1200 (Yes in operation S363). Alternatively, the host 1100 may determine that the second exception event has not occurred (No in operation S363), and terminate execution of operation S360.

In operation S364, the host 1100 may check a type of the second exception event. In an embodiment, when the first response UPIU does not include information about the type of the second exception event, the host 1100 may send, to the storage device 1200, the second query request UPIU. The host 1100 may receive, from the storage device 1200, the second query response UPIU to the second query request UPIU. For example, the second query request UPIU may be a signal for checking the exception event status field (e.g., wExceptionEventStatus field) of the attributes of the storage device 1200.

In an embodiment, when the first response UPIU includes information about the type of the first exception event, the host 1100 may check the type of the second exception event with reference to an exception event type alert field (e.g., FLD2 of FIG. 11) of the second response UPIU without sending the second query request UPIU.

In operation S365, the host 1100 may perform a second operation for the second exception event. For example, the second operation may be an operation of handling the second exception event. For example, the second operation may include adding a second entry corresponding to the operation of handling the second exception to a work queue (e.g., work queue 1121b of FIG. 9A).

In operation S366, the host 1100 may adjust the EECC. The host 1100 may send the query request UPIU for changing the EECC. The query request UPIU may be a signal for changing a setting value of the exception event check cycle field (e.g., wExceptionEventCheckCycle field of FIG. 7B) of the attributes of the storage device 1200.

The storage device 1200 may change the EECC in response to the query request UPIU. The storage device 1200 may change the setting value of the exception event check cycle field of the attributes of the storage device 1200 in response to the query request UPIU.

For example, the first exception event may be the too high temperature exception event, may be the too low temperature exception event, or may be the performance throttling exception event. In such an example, at a point in time when the second response UPIU is received, the EECC may have a first value (e.g., 100 ms). For example, the second exception event may be the too high temperature exception event, may be the too low temperature exception event, or may be the performance throttling exception event. In such an example, the host 1100 may change the EECC to a second value (e.g., zero (0) seconds).

According to embodiment, when an exception event associated with a temperature and/or a performance throttling exception event occurs in the storage device 1200, the storage system 1000 may set the EECC to be relatively long. Accordingly, the storage system 1000 may reduce the system overhead due to the event that an exception event already recognized is repeatedly checked.

Figure 15:
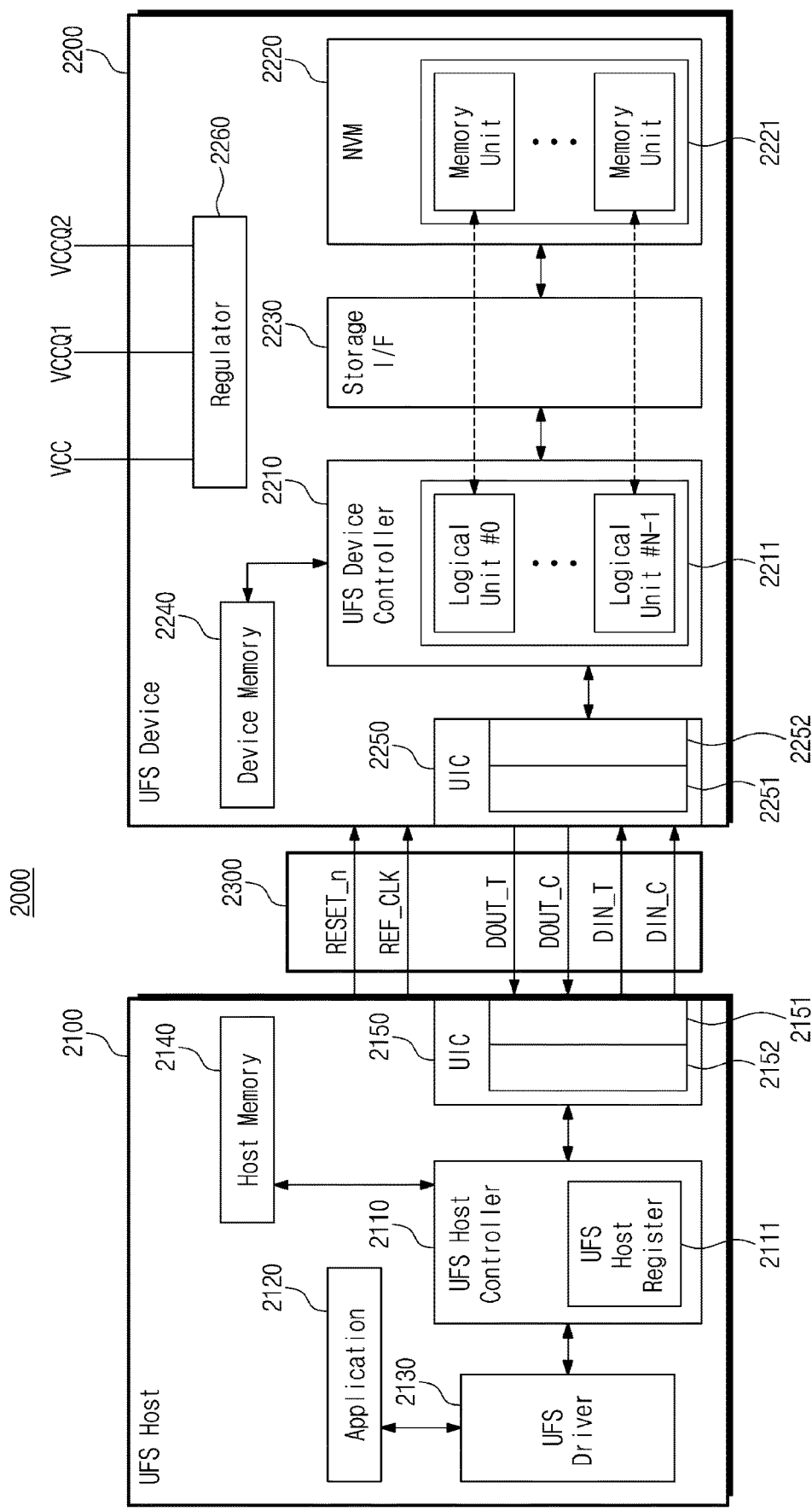
FIG. 15 is a diagram illustrating an UFS system, according to an embodiment.

FIG. 15 is a diagram illustrating a UFS system 2000, according to an embodiment. The UFS system 2000 may be a system conforming to a UFS standard announced by the Joint Electron Device Engineering Council (JEDEC). The UFS system 2000 may include a UFS host 2100, a UFS device 2200, and a UFS interface 2300. The architecture of the UFS system 2000 depicted in FIG. 15 is similar in many respects to the architecture of the storage system 1000 described above with reference to FIG. 1, and may include additional features not mentioned above.

Referring to FIG. 15, the UFS host 2100 may be connected to the UFS device 2200 through the UFS interface 2300. The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface (I/F) 2230, a device memory 2240, a UIC layer 2250, and a regulator 2260. The NVM 2220 may include a plurality of memory units 2221. Although each of the memory units 2221 may include a V-NAND flash memory having a two-dimensional (2D) structure or a three-dimensional (3D) structure, each of the memory units 2221 may include another kind of NVM, such as, but not limited to, PRAM and/or RRAM. The UFS device controller 2210 may be connected to the NVM 2220 through the storage interface 2230. The storage interface 2230 may be configured to comply with one or more standard storage protocols, such as, but not limited to, Toggle, open NAND flash interface (ONFI), and the like.

The application 2120 may refer to a program that may communicate with the UFS device 2200 to use functions of the UFS device 2200. For example, the application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command that may conform to an UFS standard and may transmit the UFS command to the UFS host controller 2110. One IOR may be converted into a plurality of UFS commands. Although the UFS command may be described by an SCSI standard, the UFS command may be a command conforming to a UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_T and DIN_C, and a pair of lines configured to transmit a pair of differential output signals DOUT_T and DOUT_C.

A frequency of a reference clock signal REF_CLK provided from the UFS host 2100 to the UFS device 2200 may be one of 19.2 megahertz (MHz), 26 MHz, 38.4 MHz, and 52 MHz, without being limited thereto. The UFS host 2100 may change the frequency of the reference clock signal REF_CLK during an operation. That is, the UFS host 2100 may change the frequency during data transmission and/or receiving operations between the UFS host 2100 and the UFS device 2200. The UFS device 2200 may generate cock signals having various frequencies from the reference clock signal REF_CLK provided from the UFS host 2100, by using a phase-locked loop (PLL). The UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 15, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although FIG. 15 illustrates one transmission lane and one receiving lane, the present disclosure is not limited in this regard and the number of transmission lanes and the number of receiving lanes may be changed without departing from the scope of the present disclosure.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. Alternatively or additionally, control data (e.g., a command) from the UFS host 2100 to the UFS device 2200 and user data to be stored in and/or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may generally control operations of the UFS device 2200. The UFS device controller 2210 may manage the NVM 2220 by using a logical unit (LU) 2211, which may be and/or may include a plurality of logical data storage units (e.g., zero-th logical data storage unit to (N-1)-th logical data storage unit, where N is a positive integer greater than zero (0)). The number of LUs 2211 may be 8 (e.g., N=8), without being limited thereto. The UFS device controller 2210 may include a flash translation layer (FTL) and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to four (4) kilobytes (KB).

When a command from the UFS host 2100 is applied through the UIC layer 2250 to the UFS device 2200, the UFS device controller 2210 may perform an operation in response to the command and transmit a completion response to the UFS host 2100 when the operation is completed.

For example, when the UFS host 2100 needs to store user data in the UFS device 2200, the UFS host 2100 may transmit a data storage command to the UFS device 2200. When a response (e.g., a ready-to-transfer response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which may be temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an error control code (ECC) engine embedded therein. That is, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

The UFS device controller 2210 may transmit user data, which may be temporarily stored in the device memory 2240, to the UFS host 2100. The UFS device controller 2210 may further include an advanced encryption standard (AES) engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In such an example, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. In an embodiment, the CQ may be implemented as a circular queue in which a start and an end of a command line stored in a queue may be indicated by a head pointer and a tail pointer.

Each of the plurality of memory units 2221 may include a memory cell array and/or a control circuit configured to control an operation of the memory cell array. The memory cell array may include a 2D memory cell array and/or a 3D memory cell array. The memory cell array may include a plurality of memory cells. Although each of the memory cells may be a single-level cell (SLC) configured to store 1-bit information, each of the memory cells may be a cell configured to store information of 2 bits or more, such as, but not limited to, a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of about 2.4 Volts (V) to about 3.6 V. The voltage VCCQ may be a power supply voltage for supplying a low voltage mainly to the UFS device controller 2210 and be in a range of about 1.14 V to about 1.26 V. The voltage VCCQ2 may be a power supply voltage for supplying a voltage, which may be lower than the voltage VCC and/or may be higher than the voltage VCCQ, mainly to an I/O interface, such as the MIPI M-PHY 2251, and may be in a range of about 1.7 V to about 1.95 V. The power supply voltages may be supplied through the regulator 2260 to respective components of the UFS device 2200. The regulator 2260 may be implemented as a set of unit regulators respectively connected to different ones of the power supply voltages described above.

Figure 16A:
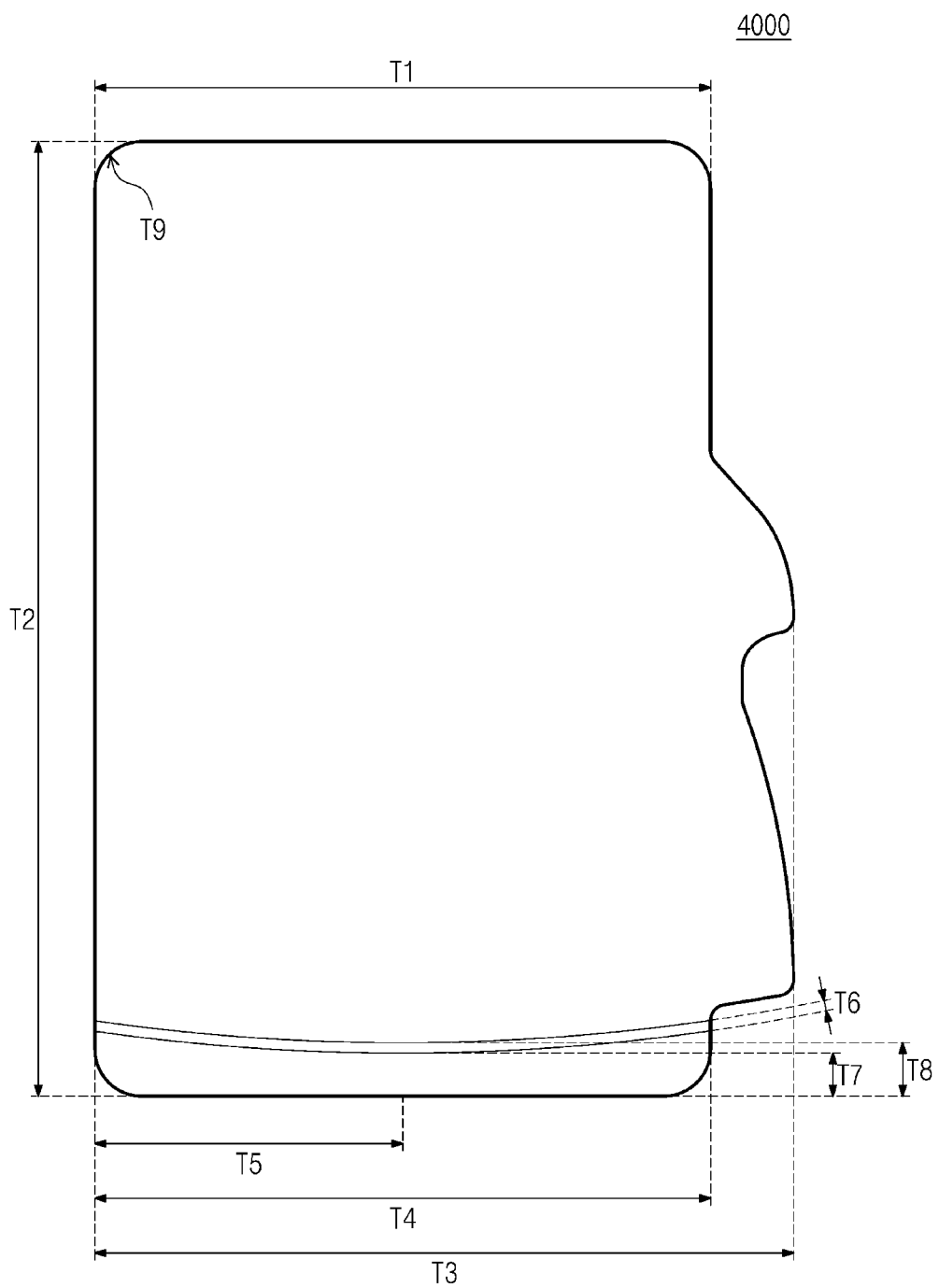
FIGS. 16A to 16C are diagrams depicting a form factor of an UFS card, according to an embodiment.
Figure 16B:
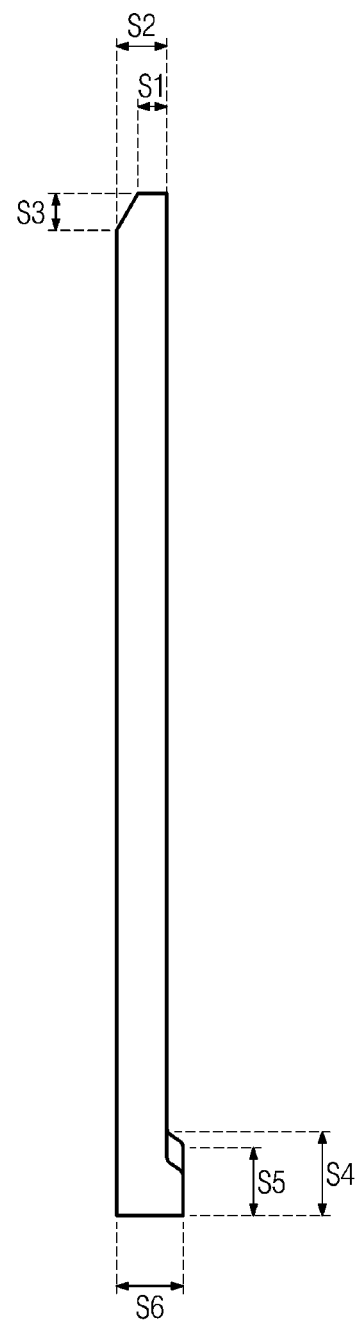
Figure 16C:
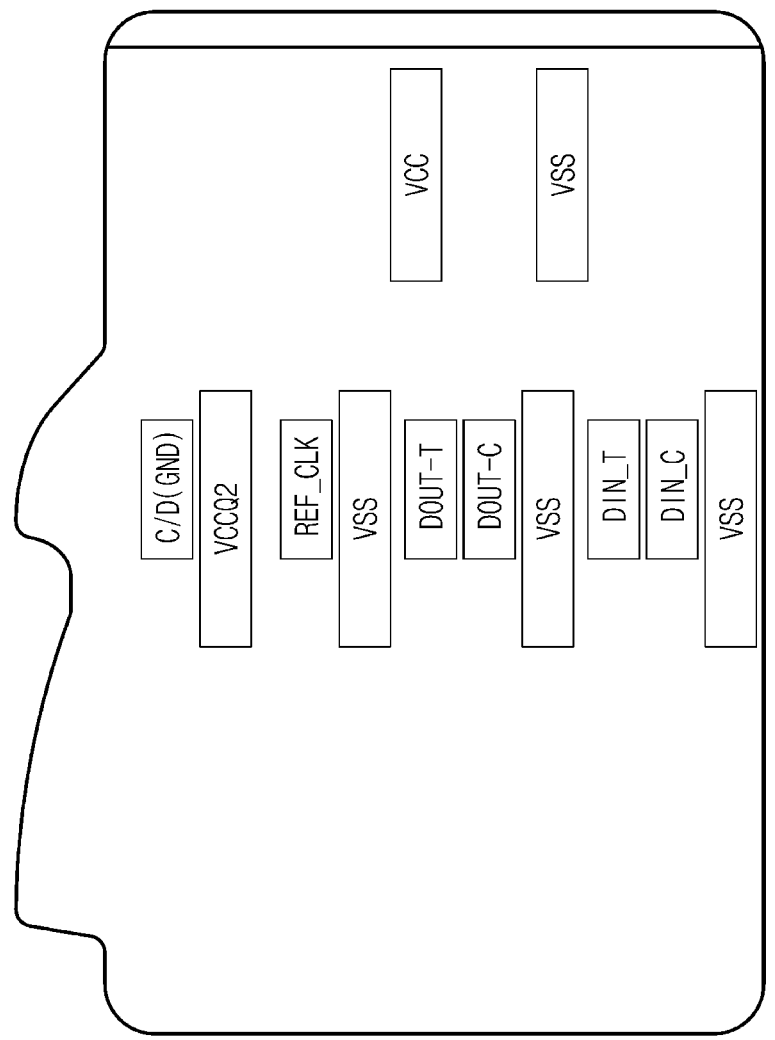

FIGS. 16A to 16C are diagrams depicting a form factor of a UFS card 4000, according to an embodiment. When the UFS device 2200 described with reference to FIG. 15 is implemented as the UFS card 4000, an outer appearance of the UFS card 4000 may be as shown in FIGS. 16A to 16C.

FIG. 16A is a top view of the UFS card 4000, according to an example embodiment. Referring to FIG. 16A, it may be seen that the UFS card 4000 entirely follows a shark-shaped design. In FIG. 16A, the UFS card 4000 may have dimensions shown in Table 1 below as an example.

TABLE 1

UFS Card Top View Dimensions

| Item | Dimension (mm) |
|---|---|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 16B is a side view of the UFS card 4000, according to an example embodiment. In FIG. 16B, the UFS card 4000 may have dimensions shown in Table 2 below as an example.

TABLE 2

UFS Card Side View Dimensions

| Item | Dimension (mm) |
|---|---|
| S1 | 0.74 ± 0.06 |
| S2 | 0.30 |
| S3 | 0.52 |
| S4 | 1.20 |
| S5 | 1.05 |
| S6 | 1.00 |

FIG. 16C is a bottom view of the UFS card 4000, according to an example embodiment. Referring to FIG. 16C, a plurality of pins for electrical contact with a UFS slot may be formed on a bottom surface of the UFS card 4000. Functions of each of the pins are described below. Based on symmetry between a top surface and the bottom surface of the UFS card 4000, some pieces (e.g., T1 to T5 and T9) of information about the dimensions described with reference to FIG. 16A and Table 1 may also be applied to the bottom view of the UFS card 400, which is shown in FIG. 16C.

A plurality of pins for an electrical connection with a UFS host may be formed on the bottom surface of the UFS card 4000. Referring to FIG. 16C, a total number of pins may be 12. Each of the pins may have a rectangular shape, and signal names corresponding to the pins may be as shown in FIG. 16C. Specific information about each of the pins may be understood with reference to Table 3 below and the above description presented with reference to FIG. 5.

TABLE 3

UFS Card Pin Configuration

| No. | Signal Name | Description | Dimension (mm) |
|---|---|---|---|
| 1 | Vss | Ground (GND) | 3.00 × 0.72 ± 0.05 |
| 2 | DIN_C | | 1.50 × 0.72 ± 0.05 |
| 3 | DIN_T | Differential input signals input from a host to the UFS card 4000 (DIN_C is a negative node, and DIN_T is a positive node) | |
| 4 | Vss | Ground (GND) | 3.00 × 0.72 ± 0.05 |
| 5 | DOUT_C | Differential output signals output from | 1.50 × 0.72 ± 0.05 |
| 6 | DOUT_T | the UFS card 4000 to the host (DOUT_C is a negative node, and DOUT_T is a positive node) | 3.00 × 0.72 ± 0.05 |
| 7 | Vss | Ground (GND) | 1.50 × 0.72 ± 0.05 |
| 8 | REF_CLK | Reference clock signal provided from the host to the UFS card 4000 | 3.00 × 0.72 ± 0.05 |
| 9 | VCCQ2 | Power supply voltage provided mainly to a PHY interface or a controller and having a lower value than voltage Vcc | 1.50 × 0.72 ± 0.05 |
| 10 | C/D (GND) | Card detection signal | 3.00 × 0.72 ± 0.05 |
| 11 | Vss | Ground (GND) | 3.00 × 0.80 ± 0.05 |
| 12 | Vcc | Main power supply voltage | |

According to embodiments of the present disclosure, when an exception event check cycle elapses, a host may determine whether an exception event occurs in a storage device, such that the overhead due to the process of handling an exception event decreases. Accordingly, an operation method of a host with potentially improved performance and an operation method of a storage system are provided.

While the present disclosure has been described with reference to embodiments thereof, it is to be apparent to those of ordinary skill in the art that various changes and modifications may be made thereto without departing from the spirit and scope of the present disclosure as set forth in the following claims.

What is claimed is:
1. An operation method of a host configured to control a storage device, the operation method comprising:
receiving, from the storage device, a first response universal flash storage (UFS) protocol information unit (UPIU) comprising first event occurrence information indicating an occurrence of a first exception event;

checking, based on the first event occurrence information, a type of the first exception event;

adjusting an exception event check cycle based on the type of the first exception event;

receiving, from the storage device prior to the exception event check cycle elapsing, a second response UPIU comprising second event occurrence information indicating an occurrence of a second exception event; and preventing processing of the second exception event, based on the second exception event occurring prior to the exception event check cycle elapsing.

2. The operation method of claim 1, further comprising:
receiving, from the storage device after the exception event check cycle elapses, a third response UPIU comprising third event occurrence information indicating an occurrence of a third exception event; and
checking, based on the third event occurrence information, a type of the third exception event.

3. The operation method claim 2, wherein the adjusting of the exception event check cycle comprises:
changing the exception event check cycle from a first cycle to a second cycle, based on the type of the first exception event being associated with a temperature of the storage device or performance throttling of the storage device, the second cycle being longer than the first cycle.

4. The operation method of claim 2, further comprising:
confirming the exception event check cycle based on an exception event check cycle field of a plurality of attributes of the storage device.

5. The operation method of claim 2, further comprising:
based on a type of the first exception event being associated with at least one of a temperature of the storage device and performance throttling of the storage device and the type of the third exception event being different from the type of the first exception event, processing the third exception event prior to processing the first exception event, and processing the first exception event after the processing of the third exception event.

6. The operation method of claim 5, further comprising:
based on the type of the third exception event matching the type of the first exception event, processing the first exception event, and preventing processing of the third exception event.

7. The operation method of claim 2, further comprising:
adding, to a work queue of the host, a first entry corresponding to an operation of processing the first exception event.

8. The operation method of claim 7, further comprising:
based on the type of the third exception event matching a type of the first exception event and the first entry being present in the work queue, preventing addition to the work queue of a second entry corresponding to an operation of processing the third exception event.

9. The operation method of claim 7, further comprising:
based on the type of the third exception event being different from the type of the first exception event, adding, to the work queue, a second entry corresponding to an operation of processing the third exception event.

10. The operation method of claim 9, further comprising:
performing at least one operation corresponding to each of the first entry and the second entry based on a first priority of the first entry and a second of the second entry.

11. The operation method of claim 2, wherein the checking of the type of the first exception event comprises:

sending, to the storage device, a first query request UPIU; and receiving, from the storage device, a first query response UPIU corresponding to the first query request UPIU and comprising first event type information indicating the type of the first exception event.

12. The operation method of claim 2, wherein the first response UPIU further comprises first exception event type information indicating the type of the first exception event.

13. The operation method of claim 12, wherein the checking of the type of the first exception event comprises:
checking a second field of the first response UPIU.

14. An operation method of a storage system, the operation method comprising:
sending, by a host of the storage system, a first command universal flash storage (UFS) protocol information unit (UPIU) to a storage device of the storage system;
sending, by the storage device to the host, a first response UPIU corresponding to the first command UPIU and comprising information about an occurrence of a first exception event, based on the first command UPIU;
checking, by the host, a type of the first exception event based on the first response UPIU;
adjusting, by the host, an exception event check cycle based on the type of the first exception event;
sending, by the host to the storage device, a second command UPIU;
sending, by the storage device to the host, a second response UPIU corresponding to the second command UPIU and comprising information about an occurrence of a second exception event, based on the second command UPIU; and
preventing, by the host, processing of the occurrence of the second exception event, based on the exception event check cycle not elapsing.

15. The operation method of claim 14, further comprising:
sending, by the host to the storage device, a third command UPIU;
sending, by the storage device to the host, a third response UPIU comprising information about an occurrence of a third exception event, based on the third command UPIU; and
checking, by the host, the occurrence of the third exception event based on the third response UPIU and based on the exception event check cycle elapsing.

16. The operation method of claim 15, further comprising:
before the sending of the first command UPIU:
sending, by the host to the storage device, a first query request UPIU;
sending, by the storage device to the host, a first query response UPIU corresponding to the first query request UPIU, based on the first query request UPIU; and
confirming, by the host, the exception event check cycle comprised in the first query response UPIU, based on an exception event check cycle field of a plurality of attributes of the storage device.

17. An operation method of a UFS host configured to control a universal flash storage (UFS) device, the operation method comprising:
confirming an exception event check cycle;
receiving, from the UFS device, a first response UFS protocol information unit (UPIU) comprising information about an occurrence of a first exception event and information about a type of the first exception event;

checking the occurrence of the first exception event and the type of the first exception event, based on the first response UPIU;

adjusting the exception event check cycle based on the type of the first exception event;

receiving, from the UFS device prior to the exception event check cycle elapsing, a second response UPIU comprising information about an occurrence of a second exception event and information about a type of the second exception event; and preventing processing of the second exception event, based on the second exception event occurring prior to the exception event check cycle elapsing.

18. The operation method of claim 17, further comprising:

receiving, from the UFS device after the exception event check cycle elapses, a third response UPIU comprising information about an occurrence of a third exception event and information about a type of the third exception event; and checking, based on the third response UPIU, the occurrence of the third exception event and the type of the third exception event.

19. The operation method of claim 18, further comprising:

based on the type of the third exception event matching the type of the first exception event, processing the first exception event, and preventing processing of the third exception event.

* * * * *